United States Patent
Lee

(10) Patent No.: US 9,794,993 B2
(45) Date of Patent: Oct. 17, 2017

(54) LED DRIVING DEVICE

(71) Applicant: Samsung Electronics Co., Ltd., Suwon-si, Gyeonggi-do (KR)

(72) Inventor: Bong Jin Lee, Hwaseong-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 15/015,117

(22) Filed: Feb. 3, 2016

(65) Prior Publication Data

US 2016/0323949 A1    Nov. 3, 2016

(30) Foreign Application Priority Data

Apr. 30, 2015 (KR) .................. 10-2015-0062146

(51) Int. Cl.
*H05B 37/02* (2006.01)
*H05B 33/08* (2006.01)

(52) U.S. Cl.
CPC ..... *H05B 33/0845* (2013.01); *H05B 33/0815* (2013.01)

(58) Field of Classification Search
CPC ............ H05B 33/0815; H05B 33/0818; H05B 41/2828; H05B 41/3921; H05B 41/3927; H05B 37/029; H05B 37/02; H05B 37/0254; H05B 33/0803; F21Y 2101/02
USPC .......................... 315/276, 278–287
See application file for complete search history.

(56) References Cited

U.S. PATENT DOCUMENTS

| | | | |
|---|---|---|---|
| 6,044,002 A * | 3/2000 | Van Der Wal | H02M 3/33523 363/21.16 |
| 6,372,608 B1 | 4/2002 | Shimoda et al. | |
| 6,645,830 B2 | 11/2003 | Shimoda et al. | |
| RE38,466 E | 3/2004 | Inoue et al. | |
| 6,818,465 B2 | 11/2004 | Biwa et al. | |
| 6,818,530 B2 | 11/2004 | Shimoda et al. | |
| 6,858,081 B2 | 2/2005 | Biwa et al. | |
| 6,967,353 B2 | 11/2005 | Suzuki et al. | |
| 7,002,182 B2 | 2/2006 | Okuyama et al. | |
| 7,084,420 B2 | 8/2006 | Kim et al. | |
| 7,087,932 B2 | 8/2006 | Okuyama et al. | |
| 7,154,124 B2 | 12/2006 | Han et al. | |
| 7,208,725 B2 | 4/2007 | Sherrer et al. | |
| 7,288,758 B2 | 10/2007 | Sherrer et al. | |
| 7,319,044 B2 | 1/2008 | Han et al. | |
| 7,501,656 B2 | 3/2009 | Han et al. | |
| 7,705,543 B2 | 4/2010 | Ragonesi et al. | |

(Continued)

FOREIGN PATENT DOCUMENTS

JP    2007073781 A    3/2007
KR   20080113591 A    12/2008

(Continued)

*Primary Examiner* — Minh D A
(74) *Attorney, Agent, or Firm* — Renaissance IP Law Group LLP

(57) ABSTRACT

A light-emitting diode (LED) driving device comprising: a rectifier configured to convert alternating current (AC) power to direct current (DC) power; a convertor including: a transformer including a primary-side winding connected to the rectifier; and a main switch connected to the primary-side winding of the transformer; a controller configured to output a control signal to the main switch in response to a feedback signal; and an output modifier configured to modify the feedback signal.

15 Claims, 23 Drawing Sheets

(56) References Cited

U.S. PATENT DOCUMENTS

| | | |
|---|---|---|
| 7,709,857 B2 | 5/2010 | Kim et al. |
| 7,759,140 B2 | 7/2010 | Lee et al. |
| 7,781,727 B2 | 8/2010 | Sherrer et al. |
| 7,790,482 B2 | 9/2010 | Han et al. |
| 7,940,350 B2 | 5/2011 | Jeong |
| 7,959,312 B2 | 6/2011 | Yoo et al. |
| 7,964,881 B2 | 6/2011 | Choi et al. |
| 7,985,976 B2 | 7/2011 | Choi et al. |
| 7,994,525 B2 | 8/2011 | Lee et al. |
| 8,008,683 B2 | 8/2011 | Choi et al. |
| 8,013,352 B2 | 9/2011 | Lee et al. |
| 8,049,161 B2 | 11/2011 | Sherrer et al. |
| 8,129,711 B2 | 3/2012 | Kang et al. |
| 8,179,938 B2 | 5/2012 | Kim |
| 8,263,987 B2 | 9/2012 | Choi et al. |
| 8,324,646 B2 | 12/2012 | Lee et al. |
| 8,399,944 B2 | 3/2013 | Kwak et al. |
| 8,432,511 B2 | 4/2013 | Jeong |
| 8,459,832 B2 | 6/2013 | Kim |
| 8,471,493 B2 | 6/2013 | Yem et al. |
| 8,502,242 B2 | 8/2013 | Kim |
| 8,536,604 B2 | 9/2013 | Kwak et al. |
| 8,735,931 B2 | 5/2014 | Han et al. |
| 8,766,295 B2 | 7/2014 | Kim |
| 8,917,528 B2 | 12/2014 | Xu |
| 2011/0001877 A1* | 1/2011 | Pugel ............... H03H 7/463 348/565 |
| 2011/0025217 A1* | 2/2011 | Zhan ............... H05B 33/0815 315/219 |
| 2011/0175543 A1* | 7/2011 | Sun ................ H05B 33/0818 315/291 |
| 2012/0056551 A1* | 3/2012 | Zhu ................ H02M 1/4258 315/232 |
| 2012/0146545 A1 | 6/2012 | Nerone |
| 2012/0262961 A1 | 10/2012 | Chien et al. |
| 2013/0063039 A1 | 3/2013 | Hwang et al. |
| 2014/0111108 A1 | 4/2014 | Qu et al. |
| 2014/0218978 A1* | 8/2014 | Heuken ............ H05B 33/0818 363/21.16 |
| 2014/0246988 A1 | 9/2014 | Chen |
| 2015/0077003 A1* | 3/2015 | Vonach ............ H05B 33/0842 315/200 R |

FOREIGN PATENT DOCUMENTS

| | | |
|---|---|---|
| KR | 20130031720 A | 3/2013 |
| KR | 101296876 B1 | 8/2013 |
| KR | 20130143077 A | 12/2013 |
| KR | 101357727 B1 | 2/2014 |
| KR | 20140017212 A | 2/2014 |
| KR | 101448659 B1 | 10/2014 |
| KR | 101474077 | 12/2014 |
| KR | 101474080 B1 | 12/2014 |
| KR | 20140138388 A | 12/2014 |

* cited by examiner

//LED DRIVING DEVICE

CROSS-REFERENCE TO RELATED APPLICATION

This application claims the benefit of Korean Patent Application No. 10-2015-0062146 filed on Apr. 30, 2015, with the Korean Intellectual Property Office, the disclosure of which is incorporated herein by reference.

BACKGROUND

Semiconductor light-emitting devices commonly include elements such as light emitting diodes (LED), and the use thereof in light sources is gradually being expanded due to advantages thereof such as low power consumption, high luminance, and relatively long operational lifespan. In the application of semiconductor light-emitting devices as light sources in various fields, there has been a challenge in designing LED driving devices differently from each other, depending on the design and operating characteristics of respective semiconductor light-emitting elements.

In addition, LED driving devices having a dimming function in which the levels of brightness of semiconductor light-emitting elements provided as light sources are adjustable, are being offered in various forms. In providing an LED driving device having a dimming function, a circuit element may be added to generate a control signal for additional dimming, resulting in reliability of the LED driving device being lowered and costs being increased.

SUMMARY

An embodiment includes a light-emitting diode (LED) driving device comprising: a rectifier configured to convert alternating current (AC) power to direct current (DC) power; a convertor including: a transformer including a primary-side winding connected to the rectifier; and a main switch connected to the primary-side winding of the transformer; a controller configured to output a control signal to the main switch in response to a feedback signal; and an output modifier configured to modify the feedback signal.

An embodiment includes A light-emitting diode (LED) driving device comprising: a rectifier configured to convert alternating current (AC) power to direct current (DC) power; a convertor including: a transformer including a primary-side winding connected to the rectifier; a main switch connected to the primary-side winding of the transformer; and an inductance modifier connected to a primary-side winding of the transformer and configured to selectively modify a primary-side inductance of the transformer; and a controller configured to output a control signal to the main switch in response to a feedback signal from the convertor.

An embodiment includes A light-emitting diode (LED) driving device comprising: a rectifier configured to convert alternating current (AC) power to direct current (DC) power; a convertor including: a transformer including a primary-side winding connected to the rectifier; and a main switch connected to the primary-side winding of the transformer; a controller configured to output a control signal to the main switch in response to a feedback signal from the convertor; and an output modifier configured to modify a time constant of the main switch.

BRIEF DESCRIPTION OF DRAWINGS

The above and other aspects, features and advantages will be more clearly understood from the following detailed description taken in conjunction with the accompanying drawings, in which.

DETAILED DESCRIPTION

Figure 1:
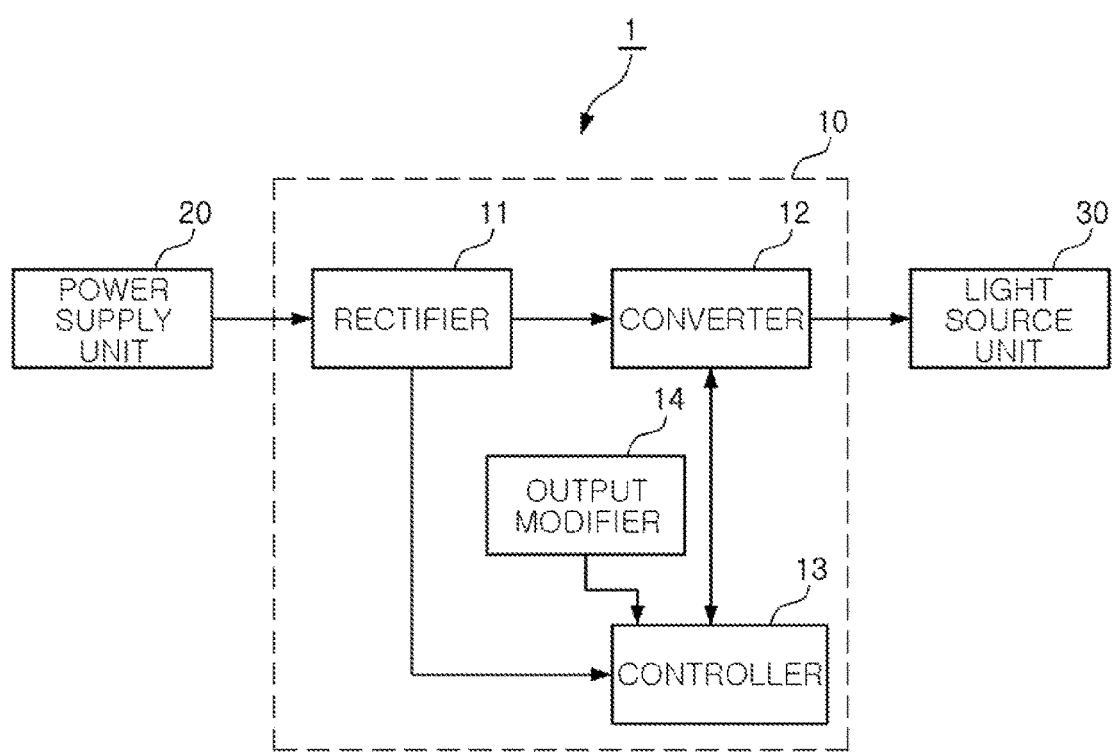
FIG. 1 is a simplified block diagram illustrating a lighting device including an LED driving device according to an embodiment.

Hereinafter, embodiments will be described in detail with reference to the accompanying drawings.

Embodiments may, however, take many different forms, and should not be construed as being limited to the specific embodiments set forth herein. Rather, these embodiments are provided so that this disclosure is thorough and complete, and will fully convey the scope of the disclosure to those skilled in the art.

In the drawings, the shapes and dimensions of elements may be exaggerated for clarity, and the same reference numerals will be used throughout to designate the same or like elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

FIG. 1 is a simplified block diagram illustrating a lighting device including an LED driving device according to an embodiment.

Referring to FIG. 1, a lighting device 1 according to an embodiment may include an LED driving device 10, a power source 20, and a light source 30. The power source 20 may be configured to output commercially-available AC power, and the light source 30 may include at least one LED. If the light source 30 includes multiple LEDs, the LEDs may be connected to each other in parallel, in series, or in other combinations in the light source 30.

The LEDs included in the light source 30 may serve as a load for the LED driving device 10, and may be configured to output light in response to a driving power output by the LED driving device 10. Thus, the light source 30 may operate efficiently when the LED driving device 10 is able to output an amount driving power adequate for load characteristics of the light source 30 as determined by a number and connection status of the LEDs included in the light source 30, and specifications of each of the LEDs. In general, hardware designs of LED driving devices have been required to be modified according to the load characteristics of the light source 30, but the load characteristics of the light source 30 of the LED driving device 10 according to this embodiment may be modified by changing the level of driving power with an adjustment without a design modification. In some embodiments, the change may only be a simple adjustment. Thus, the LED driving device 10 according to an embodiment may operate the light source 30 having various load characteristics in a more stable and efficient manner without modifications to the design.

The LED driving device 10 may include a rectifier 11, a converter 12, a controller 13, and an output modifier 14. The rectifier 11 is configured to convert AC power output by the power source 20 to DC power, and the converter 12 may be configured to supply driving power to the light source 30 using DC power output by the rectifier 11. The converter 12 may include a DC/DC converter circuit according to various topologies such as a flyback converter, a buck converter, a forward converter, similar topologies, or a combination of such topologies.

The controller 13 may be an integrated circuit (IC) chip configured to output a control signal having a predetermined operating frequency and a duty cycle ratio to the converter 12. The controller 13 may include a processor, memory, input/output interfaces, or the like to allow the controller 13 to sense outputs and/or provide inputs to the rectifier 11, the converter 12, and the output modifier 14. The characteristics of the driving power output by the converter 12 may be determined by the operating frequency and the duty cycle ratio of the control signal output by the controller 13.

The output modifier 14 may include a circuit having variable resistance characteristics. In an embodiment, the output modifier 14 may include a variable resistive element, or multiple resistors connected to each other in series or in parallel, and at least one switching element defining a connection relationship of the resistors by being connected between the resistive elements. The operating frequency and the duty cycle ratio of the control signal output by the controller 13 may be varied according to a resistance value of the output modifier 14. Thus, by providing a means by which the user may adjust the resistance value of the output modifier 14, the user may use light sources 30 having a variety of load characteristics, or implement a variety of dimming functions adjusting the brightness of the light source 30.

Figure 2:
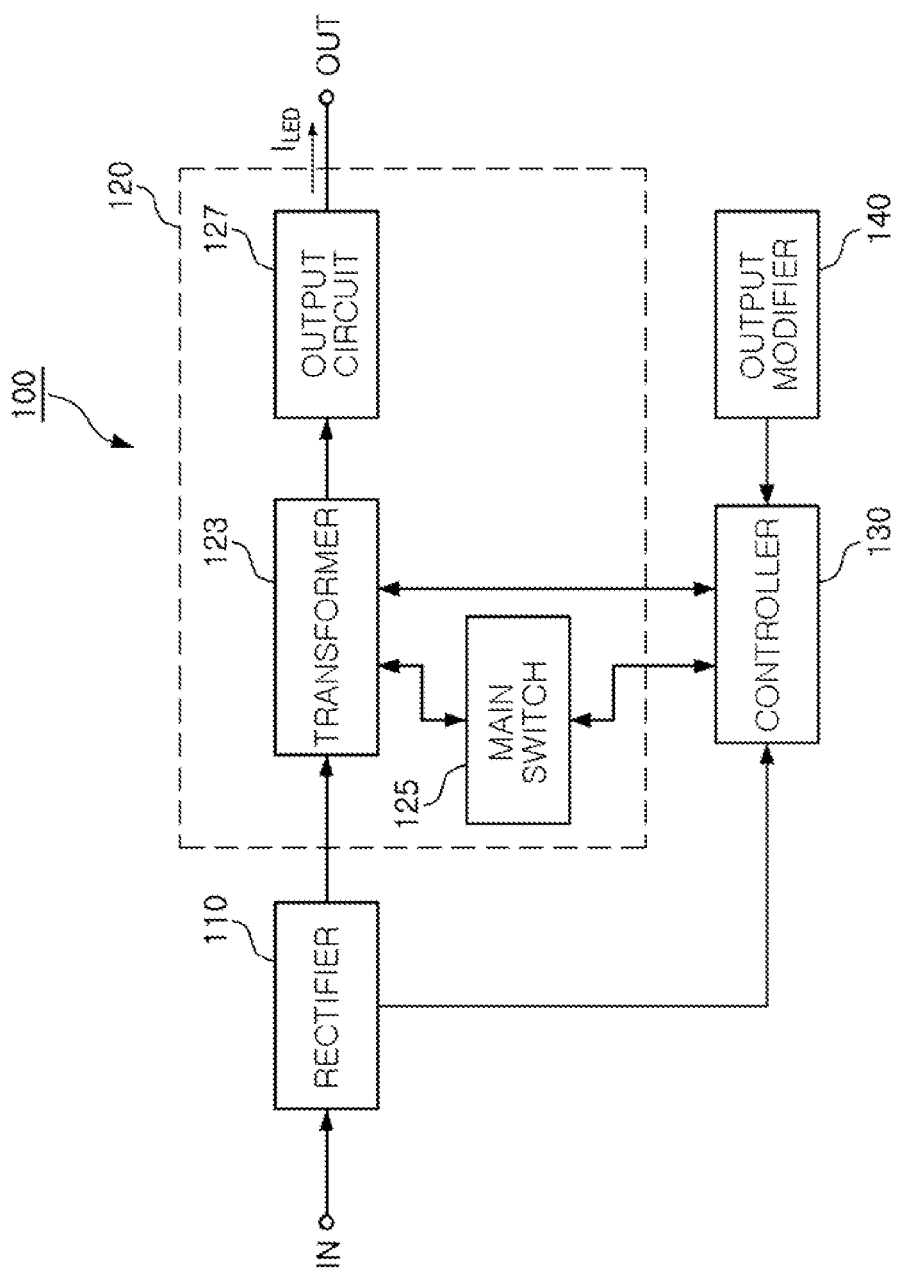
FIG. 2 is a simplified block diagram illustrating an LED driving device according to an embodiment.

FIG. 2 is a simplified block diagram illustrating an LED driving device according to an embodiment. Referring to FIG. 2, an LED driving device according to an embodiment may include a rectifier 110, a converter 120, a controller 130, and an output modifier 140. The rectifier 110 may be configured to generate DC power by converting AC power transmitted via an input terminal IN. The converter 120 may be configured to output a current $I_{LED}$ for driving at least one LED to an output terminal OUT, and operations of the converter 120 may be controlled by the controller 130 and the output modifier 140.

The converter 120 may include a DC/DC converter circuit such as a flyback converter, a buck converter, a forward converter, or the like similar to the converter 12 described above, and may also include a transformer 123, a main switch 125, and an output circuit 127. The main switch 125 may be connected to the primary-side winding of the transformer 123 in series, and the controller 130 may be configured to control operations of the converter 120 by applying a control signal to a control terminal of the main switch 125.

The magnitude of the current $I_{LED}$ output by the converter 120 may vary in response to an operating frequency and a duty cycle ratio of the control signal applied to the main switch 125 by the controller 130. In an embodiment, in a case in which the operating frequency or/and the duty cycle ratio of the control signal are increased, the magnitude of the current $I_{LED}$ may be increased, and in a case in which the operating frequency or/and the duty cycle ratio of the control signal are reduced, the magnitude of the current $I_{LED}$ may be reduced.

The operating frequency and the duty cycle ratio of the control signal may be determined by the output modifier 140. The output modifier 140 may include at least one variable resistor or multiple resistors, and at least one switching element. The output modifier 140 may be connected to the main switch 125 or a time constant control terminal of the controller 130 so that at least one of the operating frequency and the duty cycle ratio of the control signal may vary according to a resistance value of the output modifier 140.

The output circuit 127 may include a diode and a capacitor. If the main switch 125 is turned on, DC power transmitted from the rectifier 110 may be used to charge the transformer 123, and the current $I_{LED}$ may be output by the power charged in a capacitor of the output circuit 127. However, if the main switch 125 is turned off, the current $I_{LED}$ may be output by the power charged in the transformer 123.

FIGS. 3 to 9 are circuit diagrams illustrating an LED driving device according to various embodiments.

Figure 3:
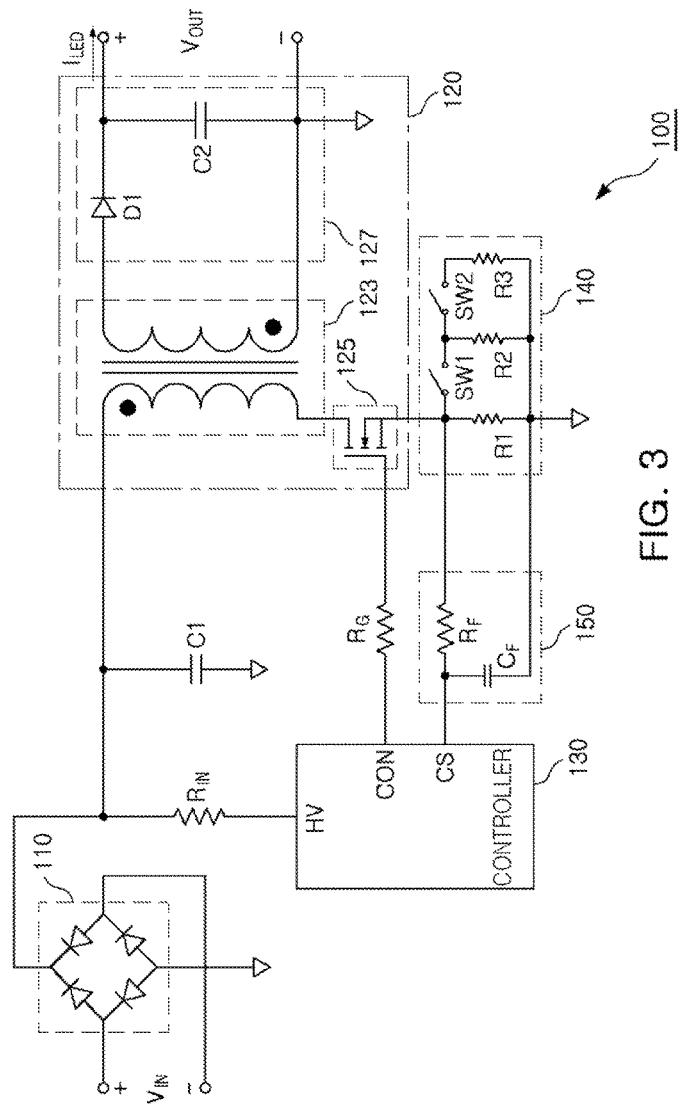
FIGS. 3 to 9 are circuit diagrams illustrating an LED driving device according to various embodiments.

Firstly, referring to FIG. 3, AC power $V_{IN}$ may be applied to the rectifier 110. The rectifier 110 may include a diode bridge circuit, and the AC power $V_{IN}$ may be converted into DC power supply. The voltage value of the DC power may be detected by a resistor $R_{IN}$ and may be applied to a high voltage (HV) pin of a controller 130. A capacitor C1 may be a bypass capacitor capable of removing high-frequency noise components.

The converter 120 may include a transformer 123, a main switch 125, and an output circuit 127. The main switch 125 may be implemented as a semiconductor device, and may include a field effect transistor (FET) in an embodiment. The main switch 125 may be connected to a primary-side winding of the transformer 123 in series, and operations of the main switch 125 may be controlled according to a control signal transmitted from the controller 130 via a resistor $R_G$.

The output circuit 127 may be connected to a secondary-side winding of the transformer 123, and may include a diode D1 and a capacitor C2. When the main switch 125 is turned on, energy may be stored in the transformer 123 from the DC power output by the rectifier 110, and the diode D1 may be biased in a reverse direction such that the DC power output by the rectifier 110 may not be transmitted to a secondary side of the transformer 123. Thus, output power $V_{OUT}$ of the converter 120 may be supplied by the energy stored in the capacitor C2. When the main switch 125 is turned off, the diode D1 may be biased in a forward direction and the output power $V_{OUT}$ may be supplied by the energy stored in the transformer 123.

The output modifier 140 may include multiple resistors R1 to R3 and switching elements SW1 and SW2 connecting or disconnecting the resistors R1 to R3 to and from each other. A total resistance value of the output modifier 140 may be varied by operations of the switching elements SW1 and SW2, and a current detection voltage applied to a current sense (CS) pin of the controller 130 may be changed according to the varied total resistance value of the output modifier 140. In a case in which a level of the current detection voltage applied through the CS pin of the controller 130 is varied, an operating frequency and a duty cycle ratio of the control signal output through a CON pin may be modified and the output current $I_{LED}$ may be increased or decreased. Meanwhile, a low-pass filter 250 including a resistor $R_F$ and capacitor $C_F$ may be provided between the output modifier 140 and the CS pin of the controller 130 so as to block switching noise.

In detail, if both of the switching elements SW1 and SW2 are turned on, the total resistance value of the output modifier 140 may be reduced, resulting in the current detection voltage being reduced, and the controller 130 may raise the output current $I_{LED}$ by increasing the operating frequency or/and the duty cycle ratio of the control signal. If the total resistance value of the output modifier 140 is increased by any one of the switching elements SW1 and SW2 being turned off, the current detection voltage may be increased, causing the controller 130 to reduce the operating frequency or/and duty cycle ratio of the control signal, and as a result, the output current $I_{LED}$ may be reduced.

Ultimately, the LED driving device 100 according to an embodiment may provide a dimming function in a manner of turning the switching elements SW1 and SW2 on and off. For example, by allowing the user to selectively turn the switching elements SW1 and SW2 on and off, the user may adjust the value of the output current $I_{LED}$, and thus, the dimming function may be implemented. The user may increase the brightness of LEDs connected to the LED driving device 100 by turning both of the switching elements SW1 and SW2 on, or may reduce the brightness of the LEDs by turning both of the switching elements SW1 and SW2 off.

In addition, the LED driving device 100 according to an embodiment may drive a variety of LEDs having load characteristics different from each other without a modification in hardware design. For example, if an LED operable at a relatively high rated current is connected to the output terminal, the user may increase the output current $I_{LED}$ of the LED driving device 100 by turning both of the switching elements SW1 and SW2 on. In contrast, if an LED operable at a relatively low rated current is connected to the output terminal, the user may reduce the output current $I_{LED}$ of the LED driving device 100 by turning at least one of the switching elements SW1 and SW2 off to prevent damage occurring from an over-current being applied to the LED.

Although discrete switches have been used as examples, in other embodiments, other variable resistance circuits may be used. For example, one or more of the resistors R1-R3 and switches SW1 and SW2 may be replaced or supplemented with a programmable resistor, a potentiometer, or the like.

Figure 4:
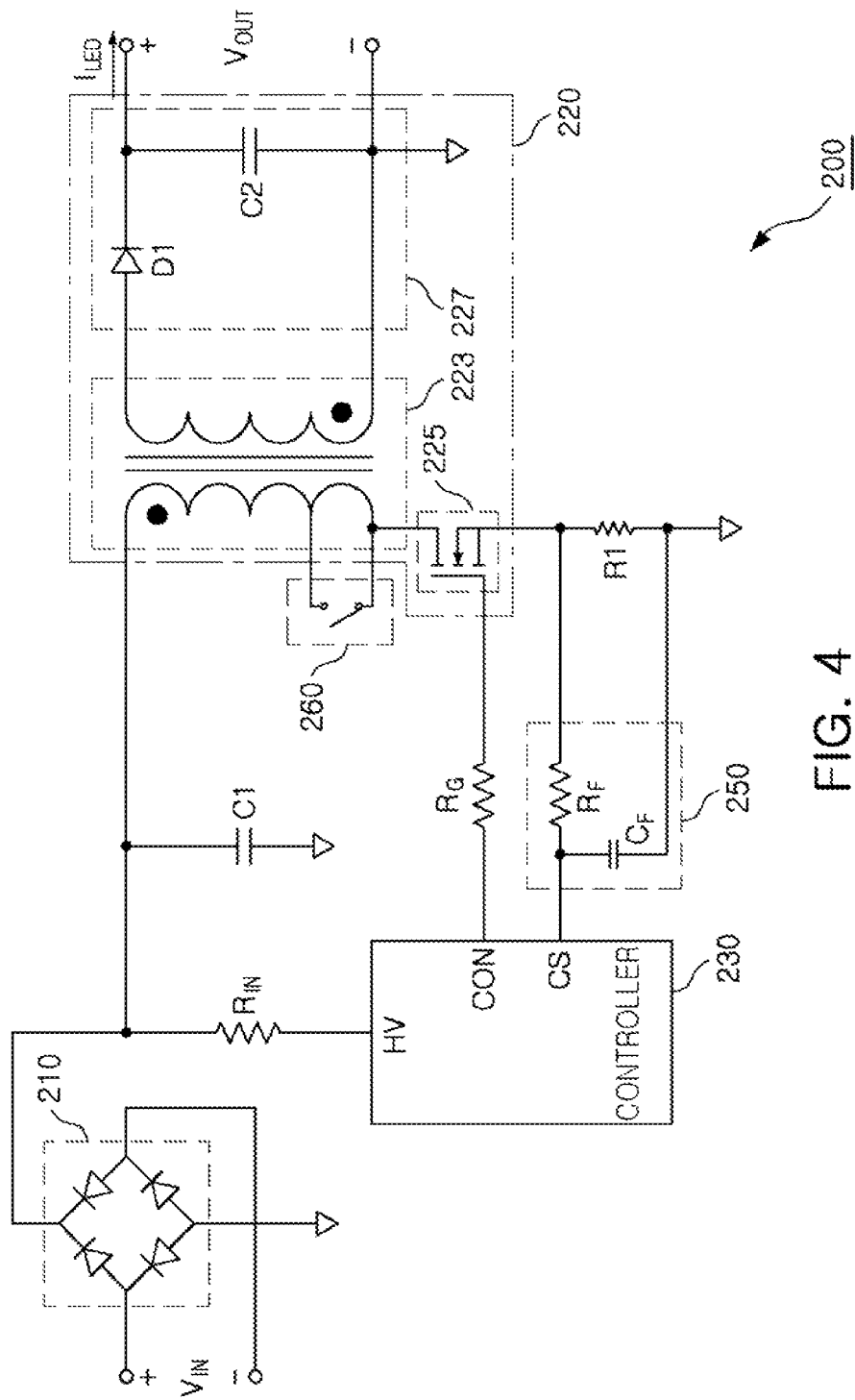

Next, referring to FIG. 4, an LED driving device 200 according to an embodiment is illustrated. The LED driving device 200 according to the embodiment illustrated in FIG. 4 includes a rectifier 210, a converter 220, a controller 230, and a low-pass filter 250 that may be similar to the corresponding components described with reference to FIG. 3.

In detail, operations of a main switch 225 may be determined by a control signal output by the controller 230 through the CON pin, and the output current $I_{LED}$ may be determined by an operating frequency or/and the duty cycle ratio of the control signal. However, in the embodiment illustrated in FIG. 4, unlike the embodiment illustrated in FIG. 3, the value of the output current $I_{LED}$ may be adjusted by an inductance modifier 260, instead of the output modifier 140.

Referring to FIG. 4, the inductance modifier 260 may be provided on a primary-side winding of the transformer 223, and the inductance modifier 260 may include a switching element connected to at least a portion of the primary-side winding of the transformer 223 in parallel. When the switching element included in the inductance modifier 260 is turned on, an inductance value of a primary-side of the transformer 223 may be relatively reduced. Thus, a current flowing through the primary-side winding of the transformer 223 may be increased, and the output current $I_{LED}$ may be increased. When the switching element included in the inductance modifier 260 is turned off, the output current $I_{LED}$ may be reduced by the current flowing through the primary-side winding of the transformer 223 being reduced due the inductance value of the primary side of the transformer 223 being relatively increased.

The LED driving device 200 according to an embodiment illustrated in FIG. 4 may provide the user a device which may turn the switching element included in the inductance modifier 260 on and off. Thus, the user may implement the dimming function by adjusting the output current $I_{LED}$, or may apply a wide range of LEDs operating by a current of different level as a light source in the LED driving device 200.

Figure 5:
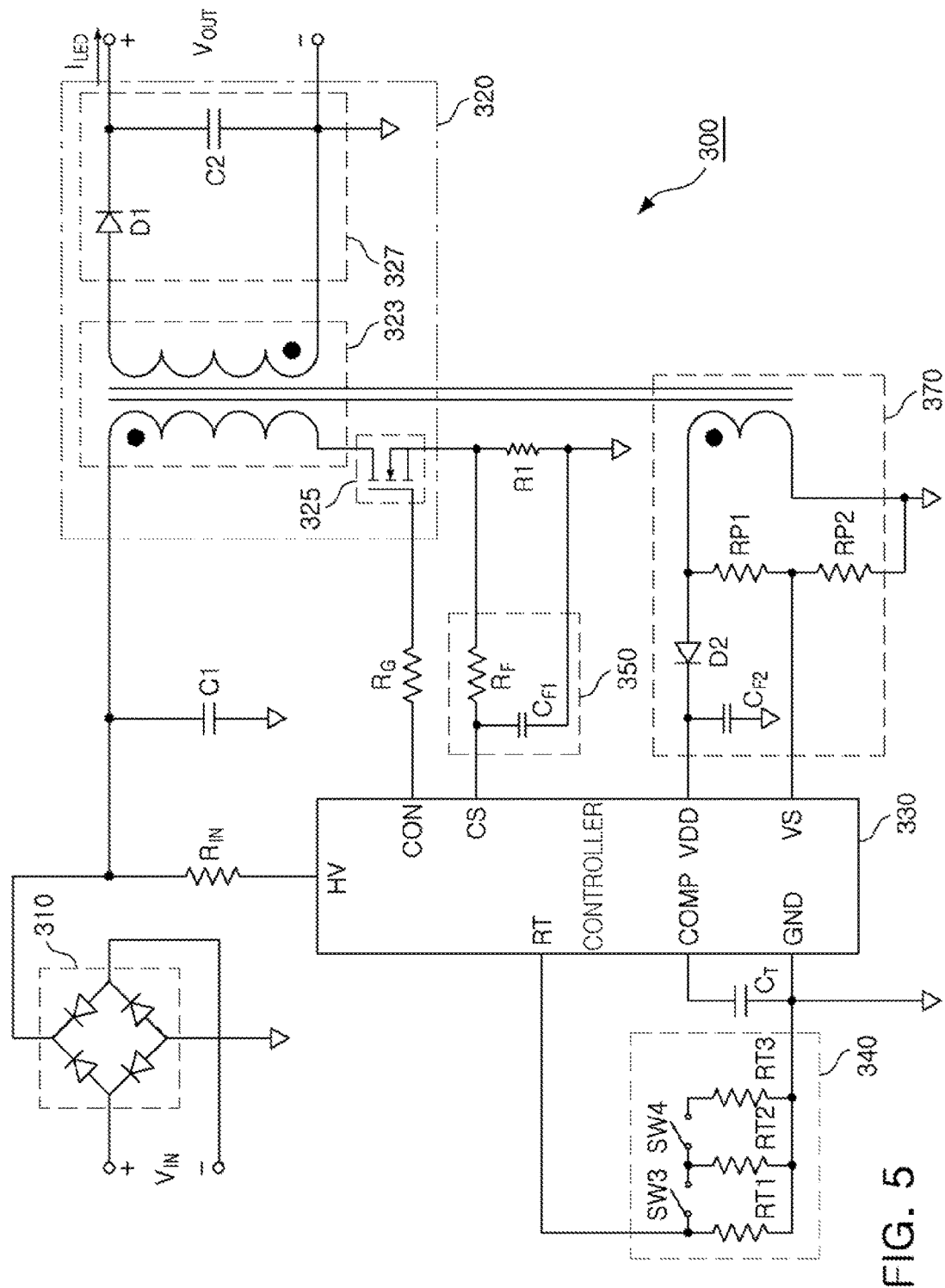

Next, referring to FIG. 5, an LED driving device 300 according to an embodiment may include a rectifier 310, a converter 320, a controller 330, and an output modifier 340 similar to the corresponding components of FIG. 3. Operations of the rectifier 310, the converter 320, and the controller 330 may be similar to the operations of the embodiment illustrated in FIGS. 3 and 4.

The controller 330 may be supplied with an initial start-up current via an HV pin connected to a resistor $R_{IN}$, and may detect current flowing through a main switch 325 via a CS pin connected to a resistor R1. In contrast to FIG. 3, in the embodiment illustrated in FIG. 5, the LED driving device 300 may include an auxiliary winding 370, and power required for operations of the controller 330 may be supplied to a VDD pin by the auxiliary winding 370. The controller 330 may calculate a secondary-side output of the transformer 323 by detecting a voltage of the auxiliary winding 370 via a VS pin.

On the other hand, the controller 330 may control an on/off operation of the main switch 325 by outputting a control signal via a CON pin, from which an output current $I_{LED}$ may be determined. In the embodiment illustrated in FIG. 5, the output modifier 340 may include a time constant control circuit connected to an RT pin of the controller 330. The output modifier 340 may be connected to an oscillator, a capacitor, or the like within the controller 330 via the RT pin, and an operating frequency of the controller 330 may be varied by a resistance value of the output modifier 340. A COMP pin, a pin for stabilizing a negative feedback loop of the converter 320, may be connected to a capacitor $C_T$, and a GND pin may be connected to a ground terminal.

The output modifier 340 may include multiple resistors RT1 to RT3 and switching elements SW3 and SW4. If the switching element SW3 and SW4 are turned on, level of resistance of the output modifier 340 may be relatively reduced, and if the switching elements SW3 and SW4 are turned off, the resistance of the output modifier 340 may be relatively increased. If the resistance of the output modifier 340 decreases, the operating frequency of the control signal output by the controller 330 may increase and the output current $I_{LED}$ may be increased due to an increase in a charge and discharge rate of a capacitor included in the controller 330. In contrast, if the resistance of the output modifier 340 increases, the operating frequency of the control signal output by the controller 330 may decrease and the output current $I_{LED}$ may become smaller, due to a decrease in the charge and discharge rate of the capacitor included in the controller 330.

The switching elements SW3 and SW4 included in the output modifier 340 may be selectively turned on and off by the user. Thus, the user may control a brightness of an LED operating by the LED driving device 300 by selectively turning the switching elements SW3 and SW4 on and off, or may apply a wide range of LEDs operating by different levels of current as a light source in the LED driving device 300.

Figure 6:
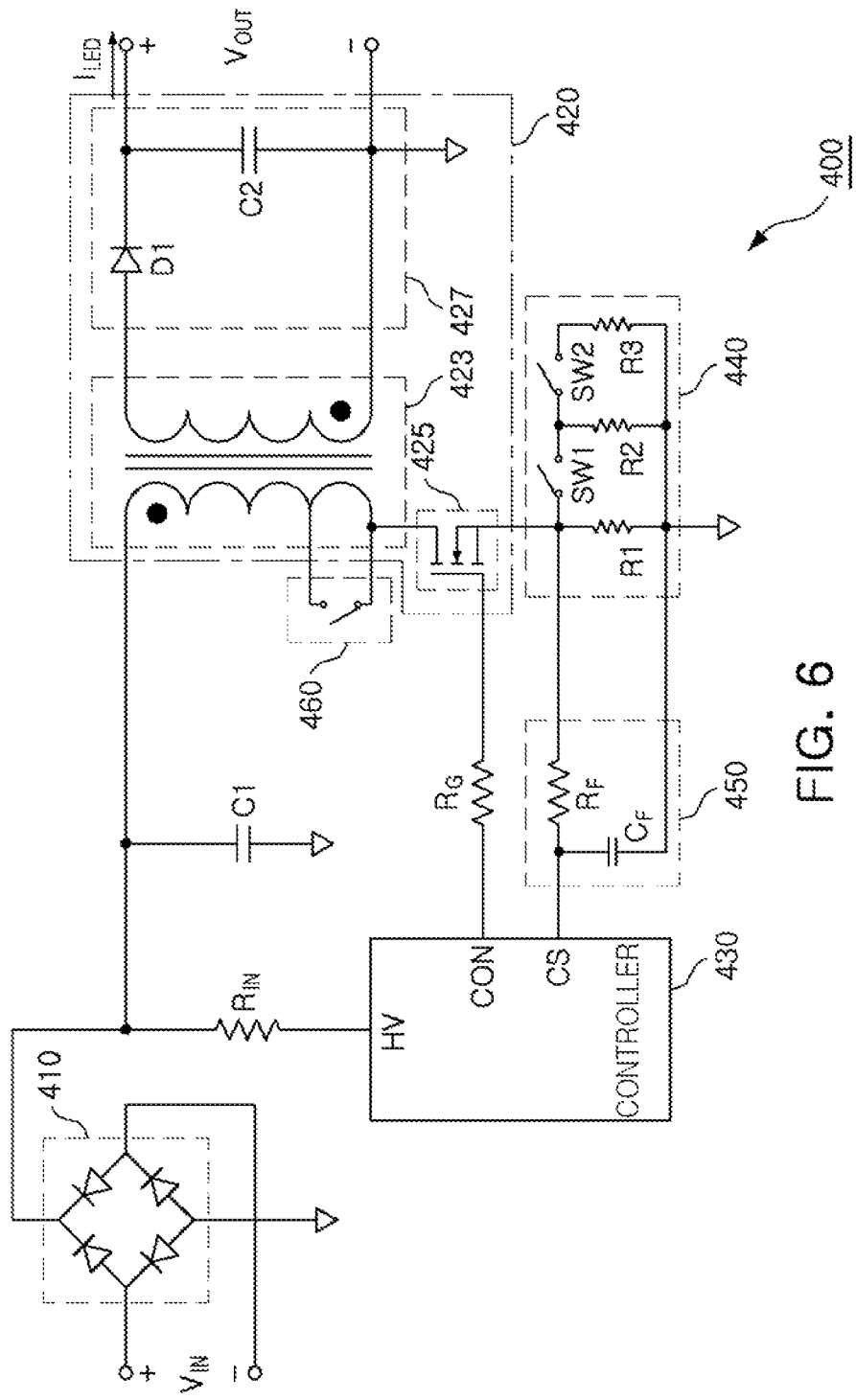

In an embodiment illustrated in FIG. 6, an LED driving device 400 may include a rectifier 410, a converter 420, a controller 430, an output modifier 440, a low-pass filter 450, and an inductance modifier 460 similar to the corresponding components of FIGS. 3 and 4. Operations of respective elements included in the LED driving device 400 may be similar to the operations described with reference to the embodiments illustrated in FIGS. 3 to 5.

Referring to FIG. 6, the LED driving device 400 may be connected to a main switch 425 in series, and may include the output modifier 440 adjusting a current detection voltage, and the inductance modifier 460 having a switching element connected to at least a portion of a primary-side winding of a transformer 423 in parallel. The user may increase or decrease an output current $I_{LED}$ by turning the switching elements SW1 and SW2 included in the output modifier 440 and/or the switching element included in the inductance modifier 460 on and off.

If a resistance value of the output modifier 440 increases due to the on/off state of the switching elements SW1 and SW2 included in the output modifier 440, the output current $I_{LED}$ may be reduced. Further, if the resistance value of the output modifier 440 decreases, the output current $I_{LED}$ may increase. When the switching element included in the inductance modifier 460 is turned on, the output current $I_{LED}$ may increase, and when the switching element included in the inductance modifier 460 is turned off, the output current $I_{LED}$ may decrease.

The user can adjust a brightness of an LED connected to the LED driving device 400 by selectively turning the switching elements included in the output modifier 440 and the inductance modifier 460 on and off, respectively. Also, a variety of LEDs having different operating characteristics may be connected to the LED driving device 400 to be used without modification in design.

Figure 7:
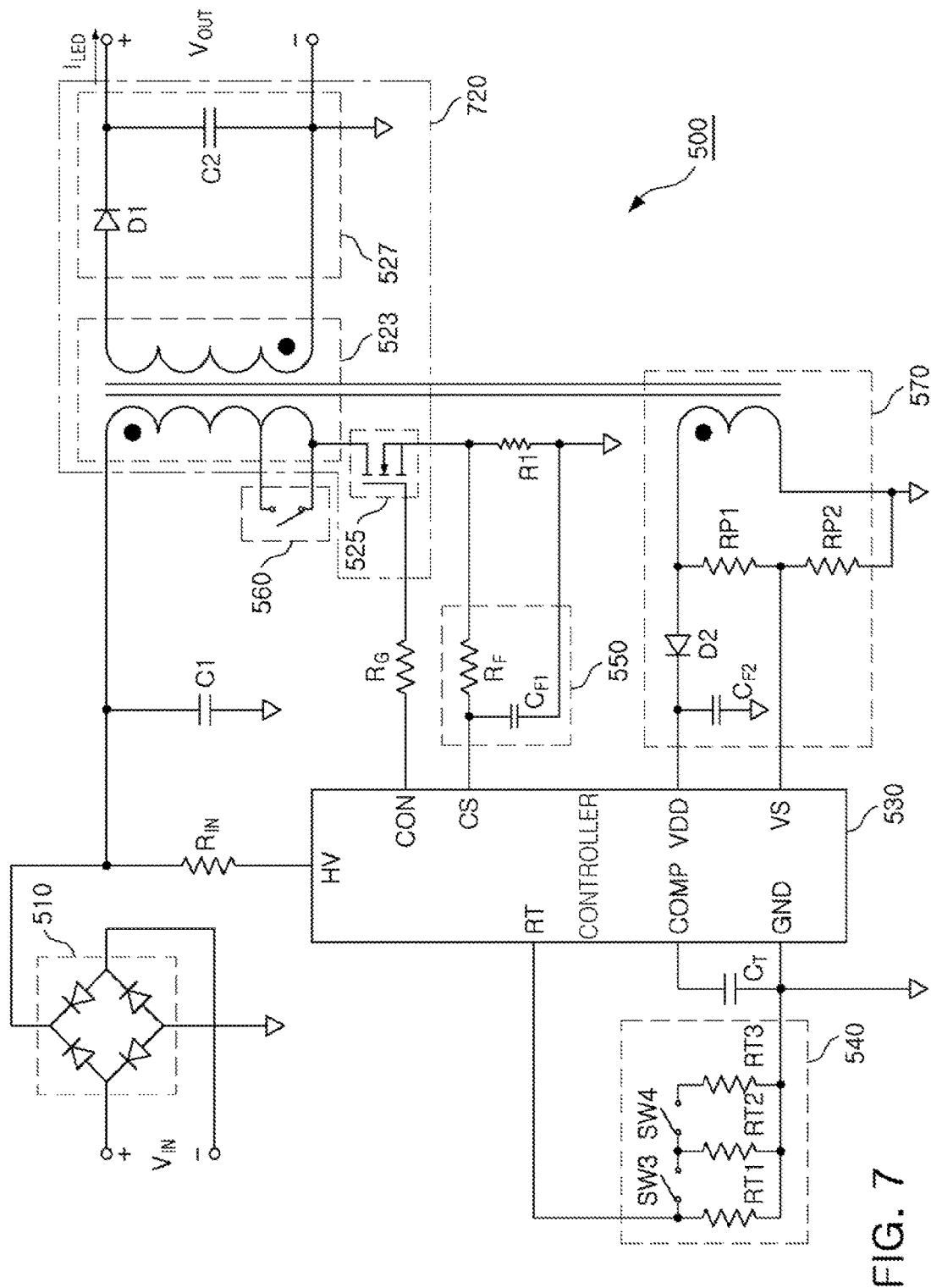

Next, referring to FIG. 7, an LED driving device 500 according to an embodiment may include a rectifier 510, a converter 520, a controller 530, an output modifier 540, a low-pass filter 550, an inductance modifier 560, and an auxiliary winding 570 similar to the corresponding components of FIGS. 3 to 6. Operations of each component included in the LED driving device 500 may be similar to the operations described with reference to the embodiments illustrated in FIGS. 3 to 6.

In the embodiment illustrated in FIG. 7, the LED driving device 500 include the output modifier 540 configured to adjust an operating frequency of the converter 520, and the inductance modifier 560 configured to adjust a primary-side inductance of a transformer 523. The output modifier 540 may be connected to an oscillator, or a capacitor included within the controller 530 via a RT pin of the controller 530. In an embodiment, a period in which the capacitor included in the controller 530 is charged or discharged may vary according to a resistance value of the output modifier 540, from which the operating frequency of the converter 520 may be modified.

The user may increase or decrease output current $I_{LED}$ by turning switching elements SW3 and SW4 included in the output modifier 540 on and off and a switching element included in the inductance modifier 560 on and off. If a brightness of an LED connected to the LED driving device 500 is to be increased, the user may turn the switching elements included in the output modifier 540 and the inductance modifier 560 on. Conversely, if the brightness of the LED is to be lowered, the user may turn the switching elements included in the output modifier 540 and the inductance modifier 560 off. In other examples, the user may use different combinations of the switching elements SW3 and SW4 and the switching element of the inductance modifier 560.

Figure 8:
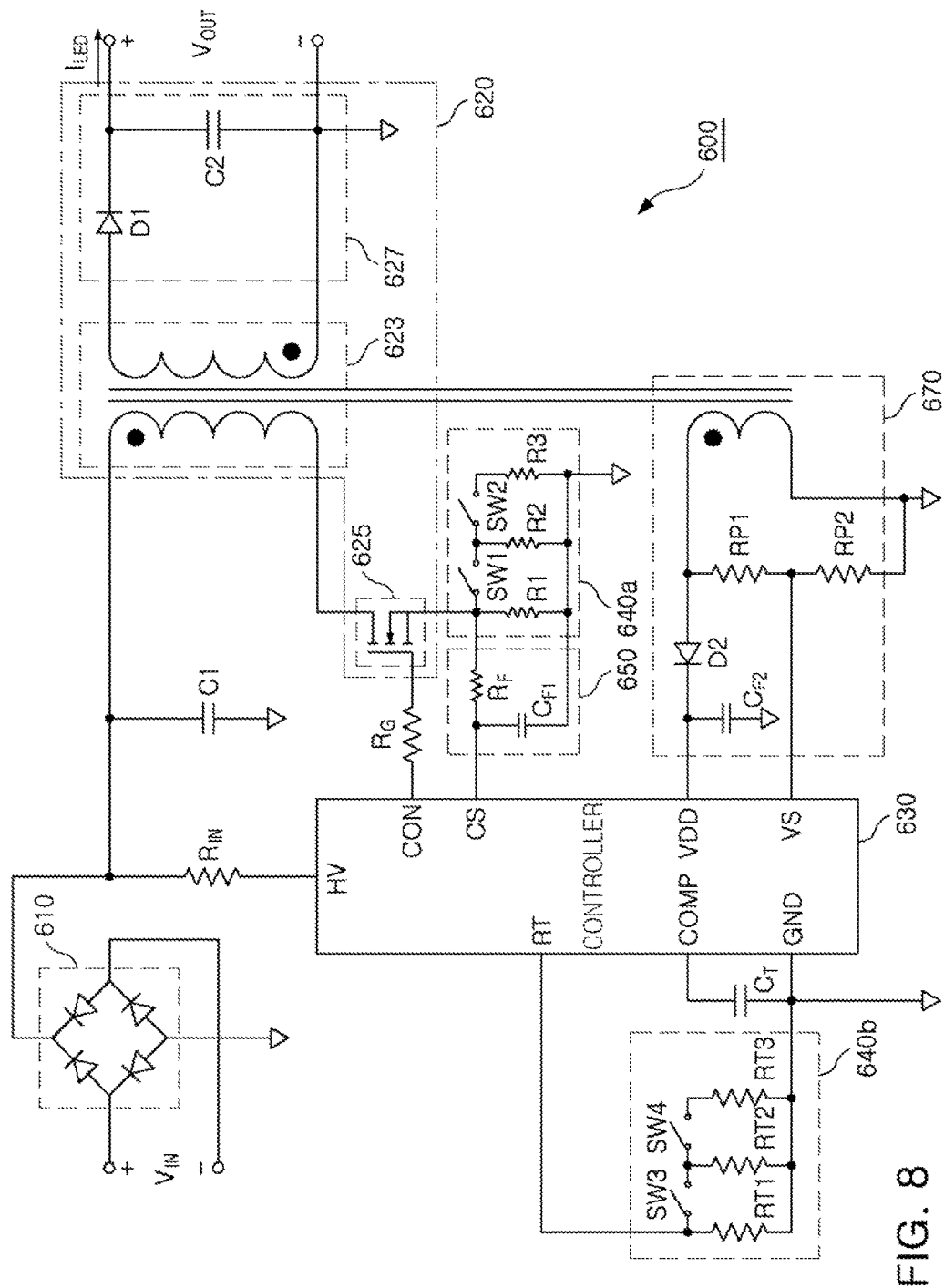

FIG. 8 is a circuit diagram illustrating an LED driving device 600 according to an embodiment including output modifiers 640a and 640b. Referring to FIG. 8, an LED driving device 600 may include a rectifier 610, a converter 620, a controller 630, output modifiers 640a and 640b, a low-pass filter 650, and an auxiliary winding 670 similar to the corresponding components of FIGS. 3 to 7. Operations of each component included in the LED driving device 600 may be similar to the operations described with reference to the embodiments illustrated in FIGS. 3 to 7. For example, the output modifier 640a may be similar to the output modifier 140 of FIG. 3 and the output modifier 640b may be similar to the output modifier 340 of FIG. 5.

In the embodiment illustrated in FIG. 8, the output modifiers 640a and 640b may include a first output modifier 640a connected to a main switch 625 and serving as a current detection resistor, and a second output modifier 640b connected to an oscillator or a capacitor within the controller 630 via a RT pin to adjust an operating frequency of the converter unit 620. The first output modifier 640a and the second output modifier 640b may include, respectively, multiple resistive elements R1 to R3 and RT1 and RT3, and switching elements SW1 to SW2 and SW3 to SW4.

The user may selectively turn the switching elements SW1 to SW4 included in the output modifiers 640a and 640b on and off respectively, to increase or decrease an amount of light of an LED operating by being connected to the LED driving device 600, or LEDs having an operating current of different magnitudes may be used as a light source without modifying the design of the LED driving device 600. A brightness of LEDs according to an on/off combination of the respective switching elements SW1 to SW4 may be provided in a form of being printed on interior and exterior walls and the like where a user manual or the LED driving device are applied.

Figure 9:
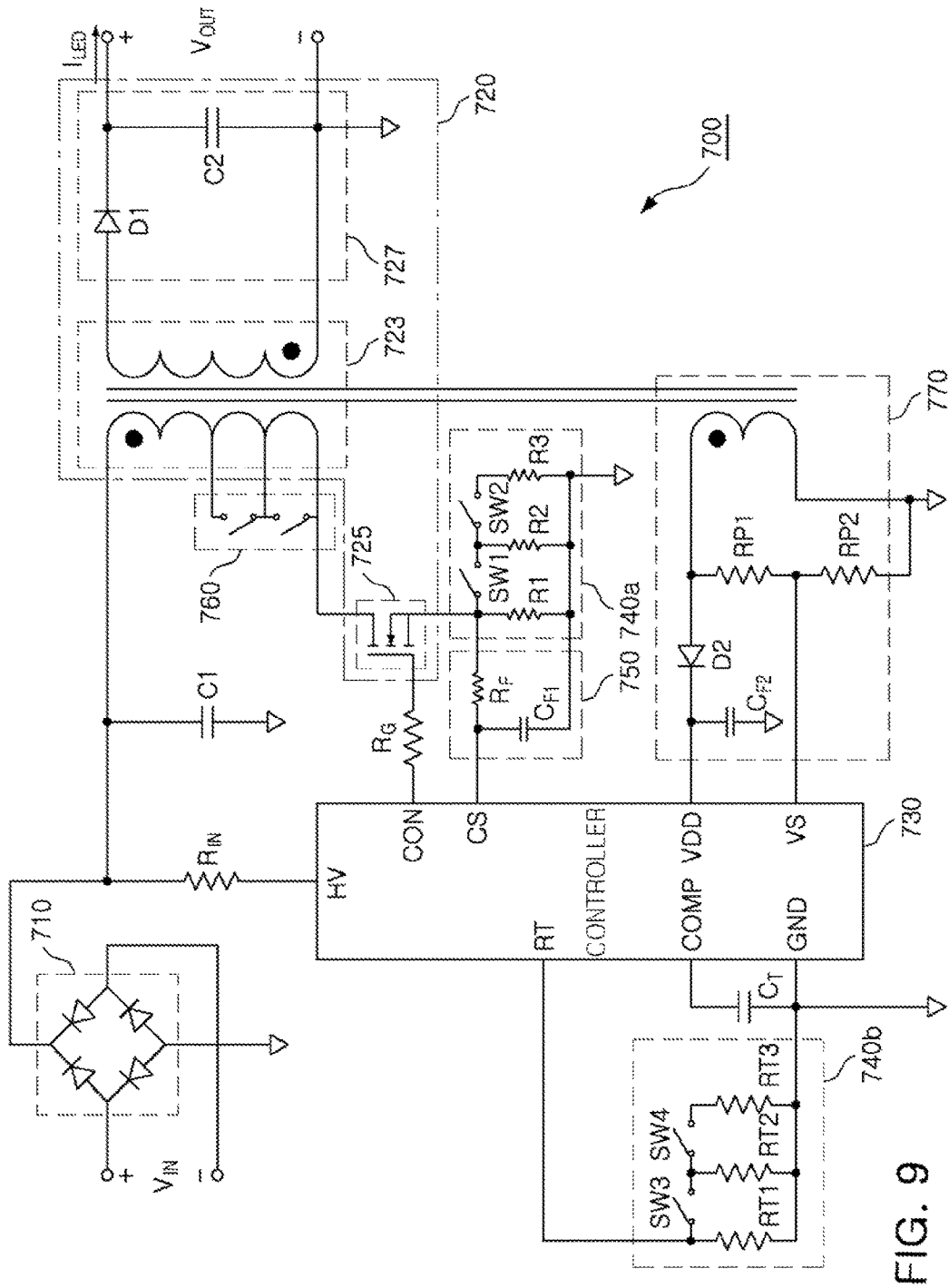

Next, referring to FIG. 9, an LED driving device 700 according to an embodiment of FIG. 9 may include a rectifier 710, a converter unit 720, a controller 730, output modifiers 740a and 740b, a low-pass filter 750, an inductance modifier 760, and an auxiliary winding 770 similar to corresponding components of FIGS. 3 to 8. Operations of each component included in the LED driving device 700 may be similar to the operations described with reference to the embodiments illustrated in FIGS. 3 to 8.

In the embodiment illustrated in FIG. 9, the output modifiers 740a and 740b may include a first output modifier 740a connected to a main switch 725 in series and configured to adjust a current detection voltage, and a second output modifier 740b connected to an oscillator or a capacitor within the controller 730 via a RT pin and configured to adjust an operating frequency of the converter 720. In addition, the LED driving device 700 may include the inductance modifier 760 having a switching element connected to at least a portion of a primary-side winding of a transformer 723 in parallel.

The user may selectively turn the switching elements included in the output modifiers 740a and 740b and the inductance modifier 760 on and off to adjust a brightness of the LED connected the LED driving device 700, or may set an output current $I_{LED}$ appropriate for the current characteristics of the LED connected to the LED driving device 700 obtaining an efficient operation of the LED. For example, if the lowest level of brightness of the LED is desired, the user may turn all of the switching elements included in the output modifiers 740a and 740b and the inductance modifier 760 off. Conversely, if the highest level of brightness of the LED is desired, the user may turn on all of the switching elements included in the output modifiers 740a and 740b and the inductance modifier 760.

In an embodiment, any one of an operating frequency and a duty cycle ratio of a control signal output from the controller may be fixed according to a type of integrated circuit chip used as the controller. By appropriately selecting the output modifier and the inductance modifier according to the type of the integrated circuit chip applied as the controller, a dimming function may be provided and an LED driving device can which may apply an LED of a variety of operating characteristics as a light source may be implemented.

For example, referring back to FIG. 3, the output modifier 140 connected to the main switch 125 of the LED driving device 100 illustrated in FIG. 3, the operating frequency and the duty cycle ratio of the control signal output by the controller 130 may be modified together according to the on/off state of the switching elements SW1 and SW2. Therefore, if the operating frequency and the duty cycle ratio of the control signal is fixed, the output current $I_{LED}$ may be adjusted by the output modifier 140.

In contrast, if the operating frequency of the control signal is fixed, employing the output modifier 340 according to the embodiment in FIG. 5 to adjust the output current $I_{LED}$ may be difficult. Thus, if the operating frequency of the control signal is fixed, the output modifier 140 connected to the main switch 125 as illustrated in FIG. 3 or the inductance modifier 260 connected to the primary-side winding of the transformer 223 as illustrated in FIG. 4 may be used to adjust the output current $I_{LED}$. On the other hand, if the duty cycle ratio of the control signal is fixed and the operating frequency is adjustable, the inductance modifier 260 according to the embodiment in FIG. 4 or the output modifier 340 according to the embodiment in FIG. 5 may be used.

Figure 10:
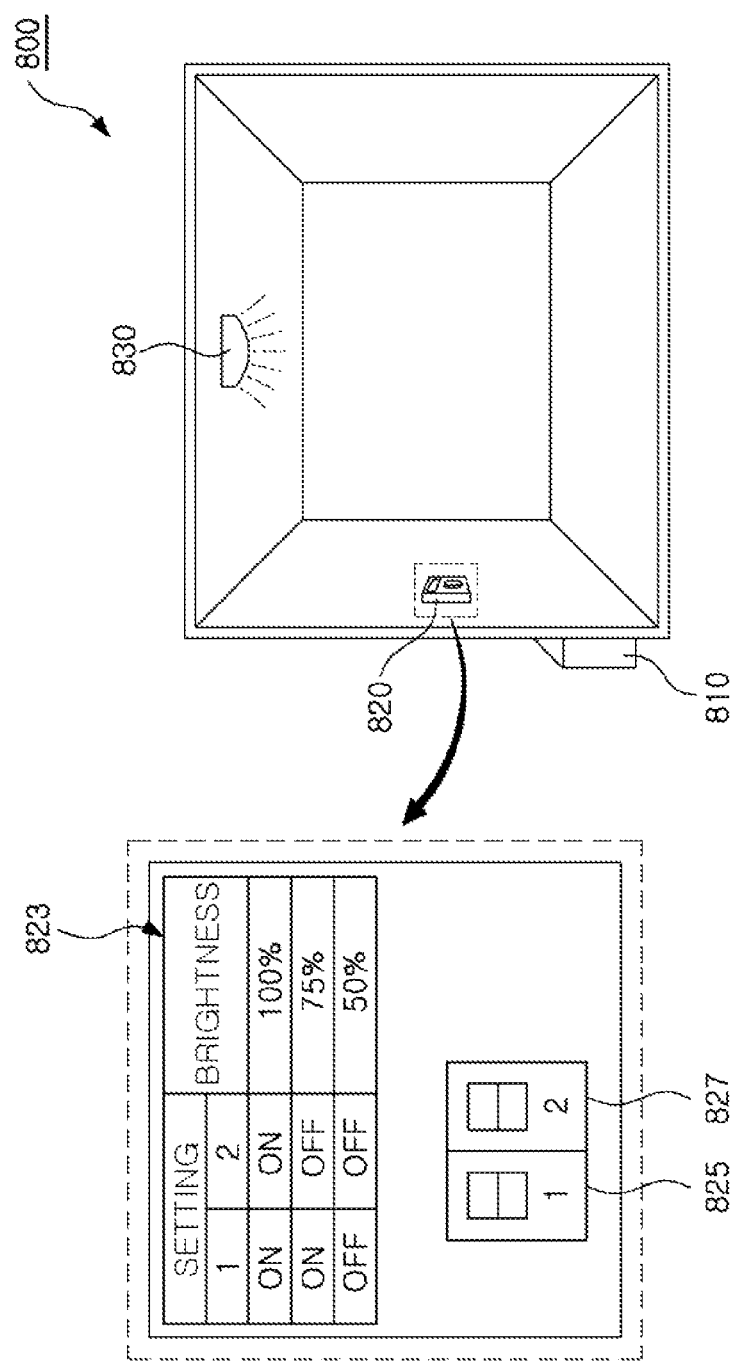
FIG. 10 is a diagram schematically illustrating a lighting system having an LED driving device according to an embodiment applied thereto.

FIG. 10 is a diagram schematically illustrating a lighting system having an LED driving device according to an embodiment applied thereto. The lighting system 800 in FIG. 10 is applied as an indoor lighting, outdoor lighting, but is not limited thereto, and may be applied to various types of indoor lighting, automotive lighting, or the like.

Referring to FIG. 10, a lighting system 800 according to an embodiment may include a sensor unit 810, a lighting control unit 820, and a light source unit 830. The light source 830 may include an LED for outputting light, and may be disposed on a ceiling, wall, or floor of a space in which the lighting system 800 is installed. The sensor unit 810 may include a temperature sensor, a brightness sensor, a humidity sensor for detecting temperature, illumination, moisture or the like, and may transmit the detected information to the lighting control unit 820.

As described above, the lighting control unit 820 may include the LED driving devices 100 to 700 according to the various embodiments, and may have a table 823 guiding the user in undertaking a dimming function and switching units 825 and 827. The table 823 may guide the user degrees of brightness of the light source unit 830 according to an on/off state of a first switch 825 and a second switch 827 included in the switching unit 825 and 827.

If the lighting control unit 820 includes the LED driving device 100 illustrated in FIG. 3, the first switch 825 and the second switch 827 may operate by being linked to the switching elements SW1 and SW2 respectively, included in the output modifier 140. For example, if the user turns the first switch 825 on, the switching element SW1 may be turned on, and if the user turns the second switch 827 off, the switching element SW2 may be turned off.

If both of the switching elements SW1 and SW2 included in the output modifier 140 are turned on, the output modifier 140 may have the lowest resistance value. Thus, the brightness of the light source unit 830 may be raised from the current detection voltage flowing through the main switch 125 being reduced, the frequency and the duty cycle ratio of the control signal output by the controller 130 being increased, and the output current $I_{LED}$ being increased. In contrast, if both of the switching elements SW1 and SW2 included in the output modifier 140 are turned off, the frequency and the duty cycle ratio of the control signal output by the controller 130 may be reduced from the current detection voltage flowing through the main switch 125 being reduced.

As a result, the brightness of the light source unit 830 may be reduced from the output current $I_{LED}$ being reduced. As illustrated in the table 823, the user may turn on both the first switch 825 and the second switch 827 to increase the brightness of the light source unit 830 to the highest degree or turn off both the first switch 825 and the second switch 827 to decrease the brightness of the light source unit 830 to the lowest degree. If only the first switch 825 is turned on, the brightness of the light source unit 830 may be set differently according to the size of the resistors R1 to R3 included in the output modifier 140. In contrast, the lighting control unit 820 of the embodiment in FIG. 10 is illustrated as including the first and second switches 825 and 827 which may be turned on and off independently of each other, but is not limited in this manner, and may also be implemented in various forms of switches such as a dial type or a slide type.

Figure 11:
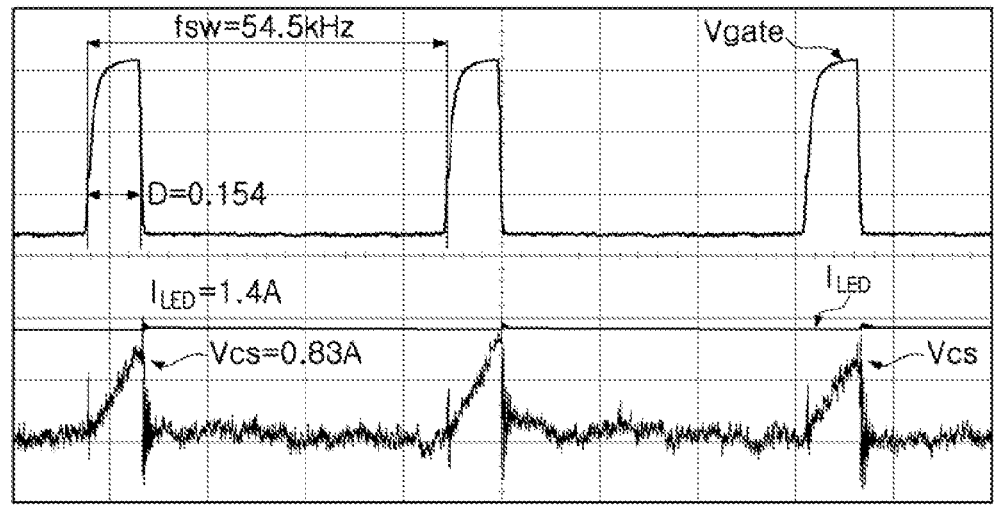
FIGS. 11 to 13 are graphs provided to describe operations of an LED driving device according to an embodiment.
Figure 12:
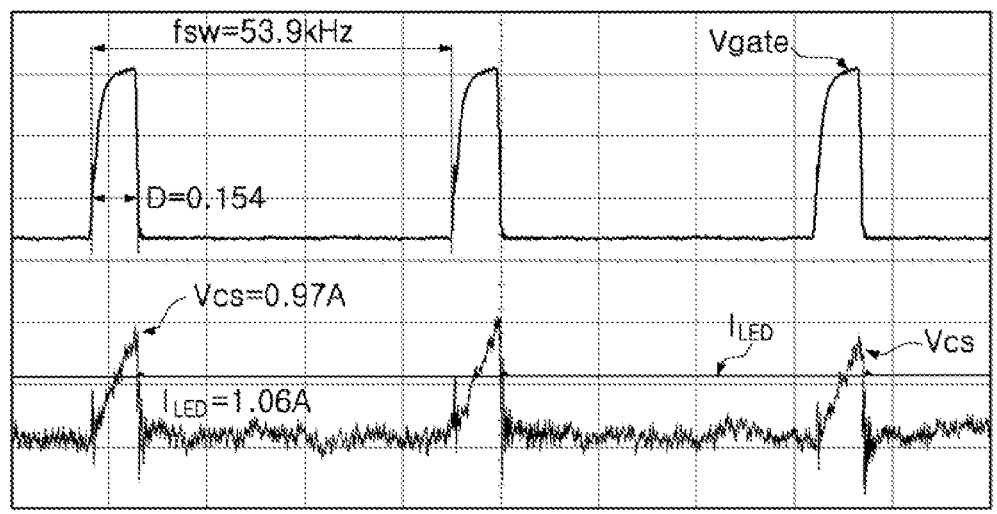
Figure 13:
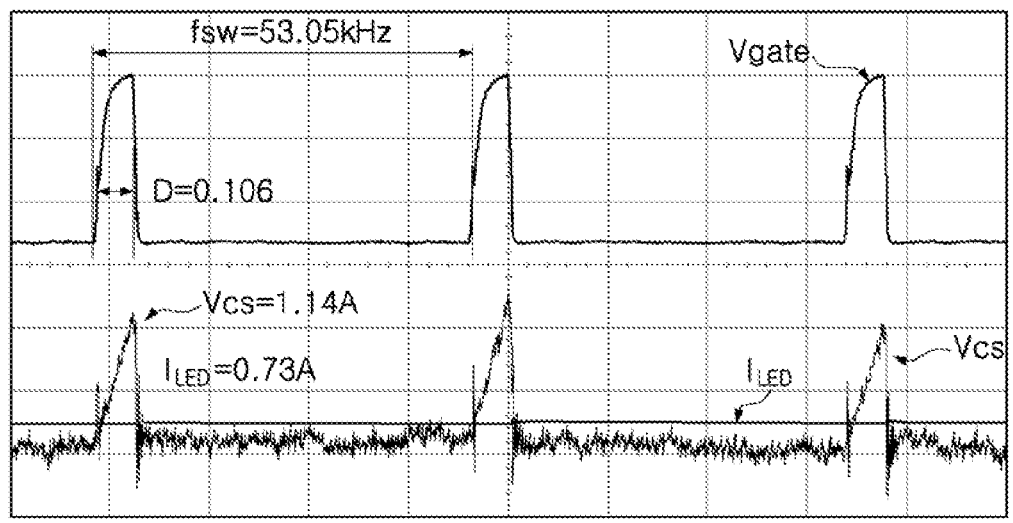

FIGS. 11 to 13 are graphs provided to describe operations of an LED driving device according to an embodiment.

Graphs illustrated in FIGS. 11 to 13 may all be applied to describe the operating characteristics of the LED driving devices 100 to 700 illustrated in FIGS. 3 to 9. Hereinafter, for convenience of description, the graphs of FIGS. 11 to 13 will be described with reference to the LED driving device 100 illustrated in FIG. 3.

Firstly, FIG. 11 is a graph illustrating a control signal Vgate output by the controller 130 and a waveform of the output current $I_{LED}$ output by the LED driving device 100 in a case in which both the switching elements SW1 and SW2 included in the output modifier 140 are turned on. FIG. 12 is a graph illustrating the control signal Vgate and the waveform of the output current $I_{LED}$ in a case in which only the switching element SW1 is turned on. Finally, FIG. 13 is a graph illustrating the control signal Vgate and the waveform of the output current $I_{LED}$ in a case in which both the switching element SW1 and SW2 are turned off.

Referring to FIG. 11, a current detection voltage $V_{CS}$ measured by the controller 130 from the output modifier 140 via the CS pin is 0.83V, a frequency of the control signal Vgate is 54.5 kHz, the measured duty cycle ratio is approximately 0.154, and the detected output current $I_{LED}$ is 1.4 A. Referring to FIG. 12, the current detection voltage $V_{CS}$ is increased to 0.97V compared to the embodiment of FIG. 11, from which both the frequency and the duty cycle ratio of the control signal Vgate is apparently reduced. As a result, the output current $I_{LED}$ is reduced to 1.06 A.

Referring to FIG. 13, the current detection voltage $V_{CS}$ is increased to 1.14V according to the switching elements SW1 and SW2 both being turned off, the frequency of the control signal Vgate is 53.05 kHz, and the duty cycle ratio is decreased to 0.106. The output current $I_{LED}$ is reduced to 0.73 A according to the frequency and the duty cycle ratio of the control signal Vgate. Therefore, the user may be able to adjust the switching elements SW1 and SW2, and by the user selectively turning the switching elements SW1 and SW2 on and off, a dimming function adjusting the brightness of the LED operating by the LED driving device 100 may be provided.

Alternatively, the brightness of the LED may be automatically adjusted to adapt to external light intensity, humidity, temperature, number of people, and the like by linking the LED driving device 100 to a specific sensor. If the external light intensity decreases, the switching elements SW1 and SW2 may be turned on to increase the brightness of the LED, or if the external light intensity increases, the brightness of the LED may be reduced, and the brightness of the LED may be controlled automatically in various other ways.

FIGS. 14 to 22 illustrate a variety of backlight units having an LED driving device according to an embodiment applied thereto.

Figure 14:
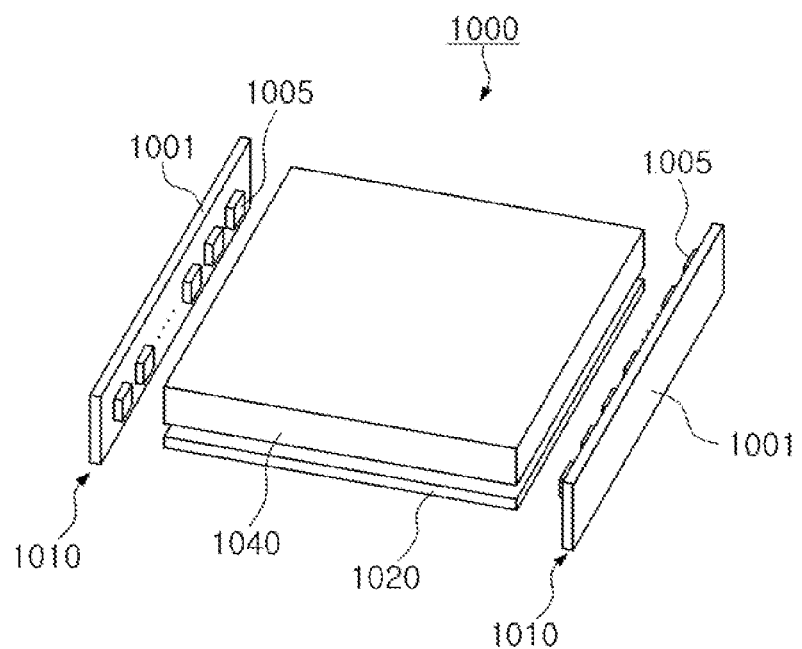
FIGS. 14 to 22 illustrate a variety of backlight units having an LED driving device according to an embodiment.

FIG. 14 is a schematic perspective view of a backlight unit according to an embodiment.

Referring to FIG. 14, a backlight unit 1000 may include a light guide plate 1040, and a light source module 1010 provided on both sides the light guide plate 1040. Further, the backlight unit 1000 may further include a reflective plate 1020 disposed below the light guide plate 1040. In the embodiment, the backlight unit 1000 may be provided as an edge type backlight unit.

According to the embodiment, the light source module 1010 may only be provided on one side of the light guide plate 1040, or may be provided additionally on the other side. The light source module 1010 may include a printed circuit board 1001, and multiple light sources 1005 mounted on an upper surface of the printed circuit board 1001.

Figure 15:
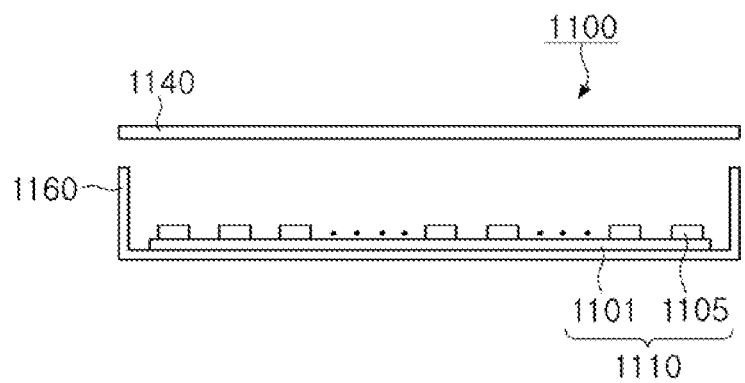

FIG. 15 illustrates an embodiment of a direct-type backlight unit.

Referring to FIG. 15, a backlight unit 1100 may include a light diffusion plate 1140, and a light source module 1110 disposed on the bottom of the light diffusion plate 1140. Further, the backlight unit 1100 may further include a bottom case 1160 disposed on the lower portion of the light diffusing plate 1140, and accommodating the light source module 1110. In the embodiment, the backlight unit 1100 may be provided as a direct-type backlight unit.

The light source module 1110 may include a printed circuit board 1101, and multiple light sources 1105 mounted on an upper surface the printed circuit board 1101.

Figure 16:
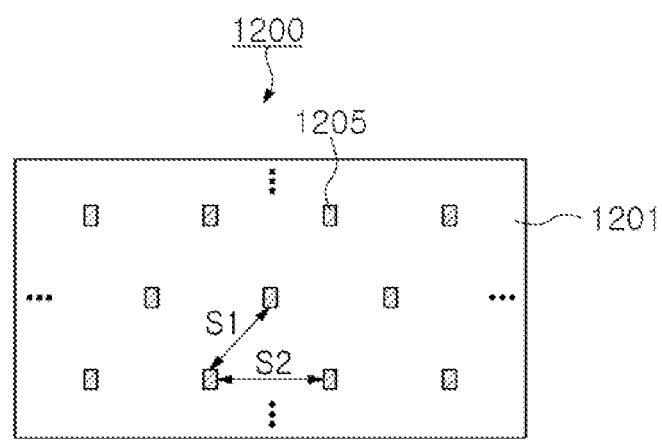

FIG. 16 illustrates a direct-type backlight unit with an example of an arrangement of light sources.

The direct-type backlight unit 1200 according to the embodiment may be provided with multiple light sources 1205 arranged on a substrate 1201.

The arrangement of the light sources 1205 may be a matrix structure of rows and columns with each row and/or column having being offset from each other in a zigzag shape. This may be a structure of a first matrix in which multiple light sources 1205 may be arranged in rows and columns in a straight line, having a second matrix disposed inside the first matrix. The arrangement structure may be understood as each light source 1205 of the second matrix being located in a rectangular interior formed by four adjacent light sources 1205 included in the first matrix.

However, in order to further improve a uniformity of luminance and luminous efficiency in the direct-type backlight unit, the arrangement and spacing of the first and second matrices may be different from each other as required. Further, in addition to the light sources arranged in such a manner, distances S1 and S2 between the adjacent light sources may be provided to ensure increased uniformity in luminance.

In such a manner of arranging the rows and columns consisting of the light sources 1205 in a zigzag arrangement rather than in a straight line, the number of light sources 1205 may be reduced by approximately 15% to 25% with respect to a same light-emitting area.

Figure 17:
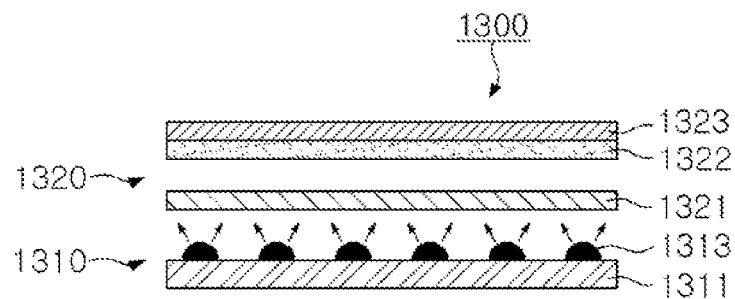

FIG. 17 illustrates another embodiment of a direct-type backlight unit.

Referring to FIG. 17, a backlight unit 1300 according to an embodiment may include an optical sheet 1320, and a light source module 1310 arranged on a bottom portion the optical sheet 1320.

The optical sheet 1320 may include a diffusion sheet 1321, a condensing sheet 1322, and a protective sheet 1323.

The light source module 1310 may include a circuit board 1311, multiple light sources 1312 (see FIG. 18) mounted on the circuit board 1311, and multiple optical elements 1313 disposed on the light sources 1312 (see FIG. 18) respectively. The light sources 1312 (see FIG. 18) may be provided as a white light source module.

The optical elements 1313 may adjust a beam angle of light through refraction. In detail, a light beam angle lens diffusing light of the light sources 1312 (see FIG. 18) over a large area may mainly be used. Since the light sources 1312 (see FIG. 18) having such optical elements 1313 attached thereto may have a wider light distribution, if a light source module is used in a backlight, flat lighting, and the like, the number of the light sources 1312 (see FIG. 18) required for the same area may be reduced.

Figure 18:
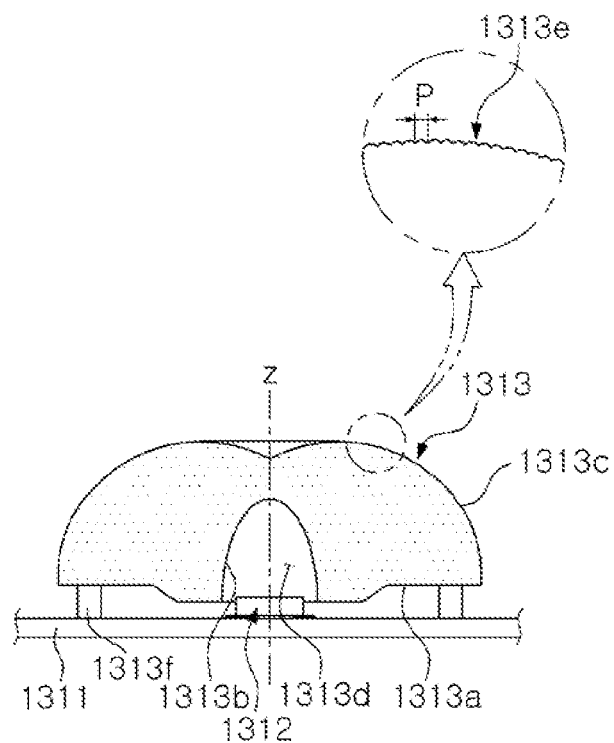

Referring to FIG. 18, the optical element 1313 may include a bottom surface 1313a disposed on the light source 1312, an entrance face 1313b through which light of the light source 1312 may enter, and an emitting surface 1313c from which light may be emitted externally.

The bottom surface 1313a may be provided with a groove 1313d recessed in a direction of the emitting surface 1313c from a center in which an optical axis Z of the light source 1312 passes through. A surface of the groove 1313d may be defined by the entrance face 1313b through which light of the light source 1312 may enter. In detail, the entrance face 1313b may form the surface of the groove 1313d.

The bottom surface 1313a may have an overall non-flat structure from a central area connected to the entrance face 1313b partially protruding toward the light source 1312. For example, unlike the general structure of the bottom surface having an overall flat surface, the bottom surface 1313a may have a partially protruding structure along a circumference of the groove 1313d. The bottom surface 1313a may be provided with multiple support portions 1313f which may fix and support the optical element 1313 if the optical element 1313 is mounted on the circuit board 1311.

The emitting surface 1313c may protrude from a border connected to the bottom surface 1313a in a dome shape in an upward direction (light-emitting direction), and may have a structure having a point of inflection from the center in which the optical axis Z passes through being concavely recessed toward the groove 1313d.

On the emitting surface 1313c multiple concave-convex portions 1313e may be arranged periodically in a border direction of the optical axis Z. The concave-convex portions 1313e may have a ring shape corresponding to a horizontal cross-sectional shape of the optical element 1313, and may form concentric circles based on the optical axis Z. In addition, the concave-convex portions 1313e may form a periodic pattern along the surface of the emitting surface 1313c with the optical axis Z as a center, and may be arranged in a structure of being spread radially.

The concave-convex portions 1313e may form a pattern by being respectively spaced apart by a predetermined pitch P. In this case, the pitch P between the concave-convex portions 1313e may have a range between about 0.01 mm to about 0.04 mm. The concave-convex portions 1313e may offset a difference in performance between the optical elements due to minor processing errors occurring in the process of manufacturing the optical elements 1313, and from which a uniformity of light distribution may be improved.

Figure 19:
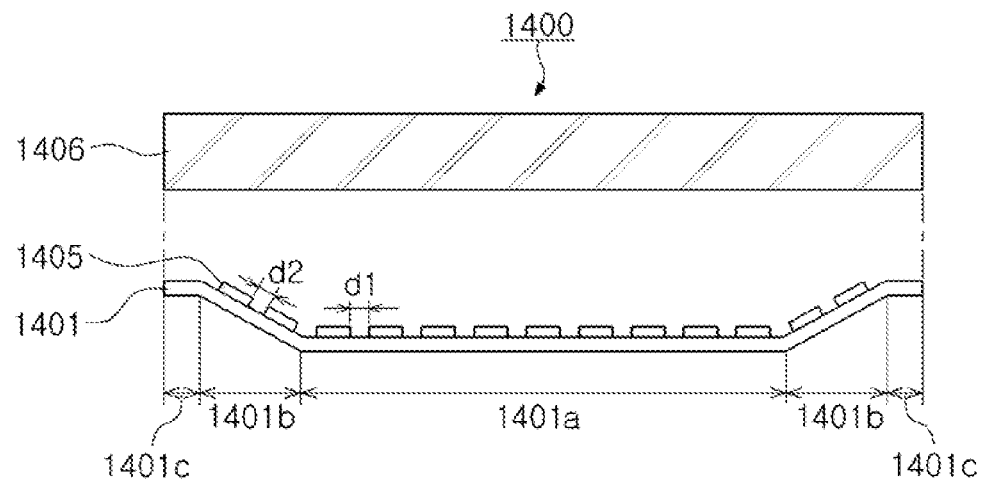

FIG. 19 illustrates another embodiment of a direct-type backlight unit.

Referring to FIG. 19, a backlight unit 1400 may include light sources 1405 mounted on a circuit board 1401, and may include at least one optical sheet 1406 disposed on the circuit board 1401. The light sources 1405 may white light emitting devices containing red phosphor according to an embodiment.

The circuit board 1401 may have a first planar portion 1401a corresponding to a main area, an inclined portion 1401b in which at least a portion of the inclined portion 1401b may be bent and disposed surrounding the first planar portion 1401a, and a second planar portion 1401c disposed on edges of the circuit board 1401 and external sides of the inclined portion 1401b. On the first planar portion 1401a, the light sources 1405 may be arranged according to a first distance dl, and on the inclined portion 1401b, one or more of the light sources 1405 may also be arranged by a second distance d2. The first distance dl may be the same as the second distance d2. A width (or length in a cross-section) of the inclined portion 1401b may be less than a width of the first planar portion 1401a, and may be formed to be longer than a width of the second planar portion 1401c. In addition, at least one light source 1405 may also be disposed on the second planar portion 1401c.

A gradient of the inclined portion 1401b may be adjusted appropriately within a range of greater than 0° and less than 90° based on the first planar portion 1401a. The circuit board 1401 may take such a structure to maintain a uniform level of brightness even in a vicinity of edges of the optical sheet 1406.

Figure 20:
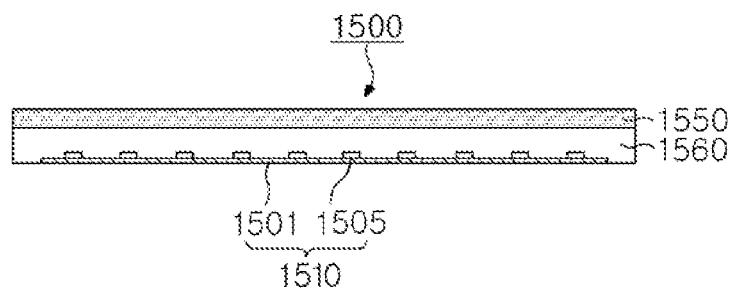
Figure 21:
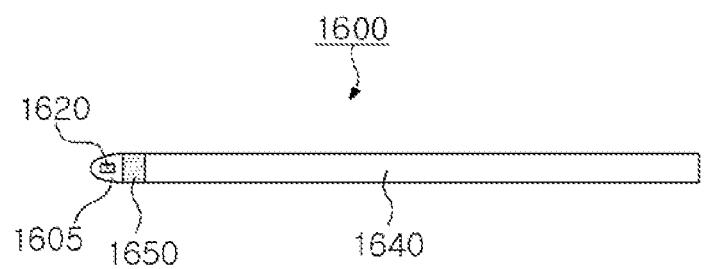
Figure 22:
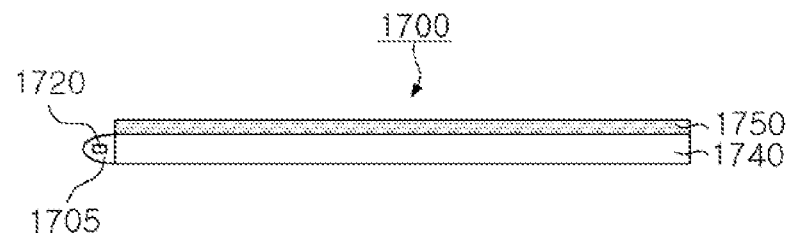

FIGS. 20 to 22 are schematic cross-sectional views of a backlight unit according to various embodiments.

Backlight units 1500, 1600, and 1700 of FIGS. 20 to 22 may have wavelength conversion units 1550, 1650, and 1750 disposed in the backlight units 1500, 1600, and 1700 externally from light sources 1505, 1605, and 1705 to convert light, instead of being disposed on the light sources 1505, 1605, and 1705.

Referring to FIG. 20, the backlight unit 1500 may be a direct-type backlight unit, which may include the wavelength conversion unit 1550, a light source module 1510 arranged on a lower portion of the wavelength conversion unit 1550, and a bottom case 1560 accommodating the light source module 1510. Further, the light source module 1510 may include a printed circuit board 1501 and multiple light sources 1505 mounted on an upper surface of the printed circuit board 1501.

In this embodiment, the backlight unit 1500 may have the wavelength conversion unit 1550 disposed on an upper portion of the bottom case 1560. Thus, at least a portion of light emitted from the light source module 1510 may be wavelength-converted by the wavelength conversion unit 1550. The wavelength conversion unit 1550 may be applied by being manufactured in a separate film, but may be provided in a combined form integrated with a light diffusion plate which is not illustrated.

Referring to FIGS. 21 and 22, the backlight units 1600 and 1700 may be edge-type backlight units, which may include the wavelength conversion units 1650 and 1750, light guide plates 1640 and 1740, and reflective portions 1620 and 1720 and the light sources 1605 and 1705 disposed to one side of the light guide plates 1640 and 1740.

Light emitted from the light sources 1605 and 1705 may be guided inside the light guide plates 1640 and 1740 by the reflective portions 1620 and 1720. In the backlight unit 1600 of FIG. 21, the wavelength conversion unit 1650 may be disposed between the light guide plate 1640 and light source 1605. In the backlight unit 1700 of FIG. 22, the wavelength conversion unit 1750 may be disposed on a light emitting surface of the light guide plate 1740.

In FIGS. 20 to 22, the wavelength conversion portions 1550, 1650, and 1750 may include a conventional phosphor. In detail, when using a quantum dot phosphor to supplement quantum dots being vulnerable to heat and moisture from light sources, the structure of wavelength conversion portions 1550, 1650, and 1750 described in FIGS. 20 to 22 may be utilized in the backlight units 1500, 1600, and 1700.

The backlight units 1000 to 1700 described above with reference to FIGS. 14 to 22 may include the LED driving devices 100 to 700 according to an embodiment. Thus, the brightness of the backlight units 1000 to 1700 may be controlled automatically according to the user adjusting the brightness of the backlight units 1000 to 1700, or surrounding light intensity, temperature, and the like detected by a sensor linked to the backlight units 1000 to 1700.

Figure 23:
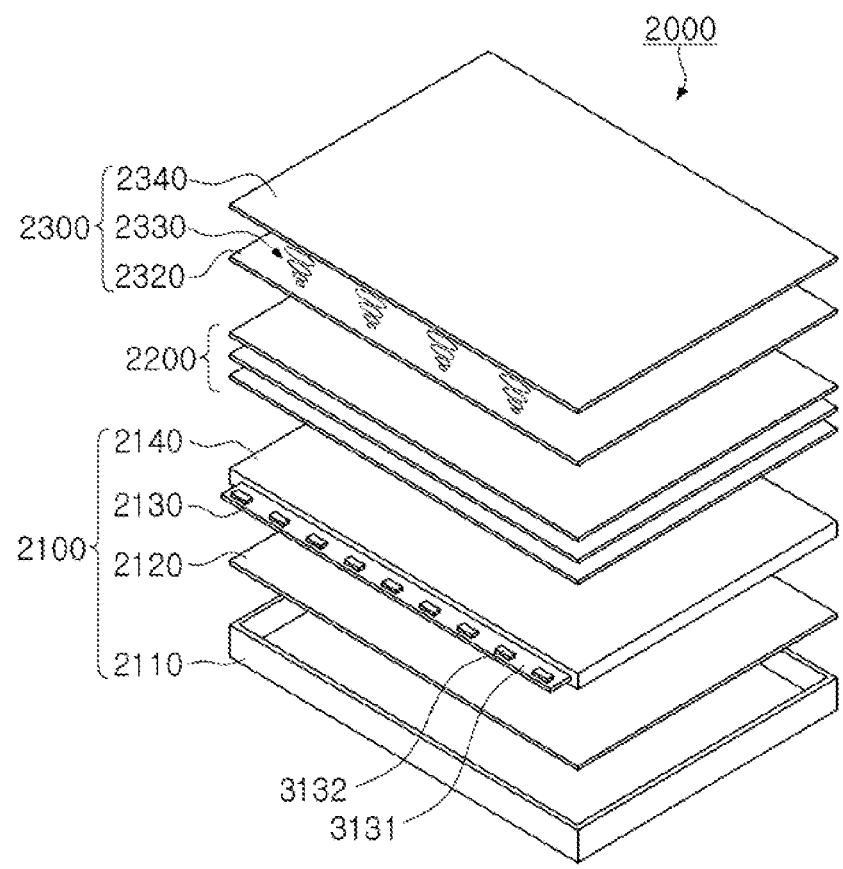
FIG. 23 is a schematic exploded perspective view of a display device including an LED driving device according to an embodiment.

FIG. 23 is a schematic exploded perspective view of a display device including an LED driving device according to an embodiment.

Referring to FIG. 23, a display device 2000 may include a backlight unit 2100, an optical sheet 2200, and an image display panel 2300 similar to a liquid crystal panel.

The backlight unit 2100 may include a bottom case 2110, a reflective plate 2120, a light guide plate 2140, and a light source module 2130 provided on at least one side of the light guide plate 2140. The light source module 2130 may include a printed circuit board 3131 and light sources 3132. In detail, the light sources 3132 may be side-view type light-emitting elements mounted on a side surface adjacent to a light emitting surface.

The optical sheet 2200 may be disposed between the light guide plate 2140 and the image display panel 2300, and may include various types of sheets such as a diffusion sheet, a prism sheet or a protective sheet.

The image display panel 2300 may be configured to display an image using light emitted from the optical sheet 2200. The image display panel 2300 may include an array substrate 2320, a liquid crystal layer 2330, and a color filter substrate 2340. The array substrate 2320 may include pixel electrodes arranged in a matrix form, thin-film transistors be configured to apply driving voltage to the pixel electrodes, and signal lines to operate the thin-film transistors. The color filter substrate 2340 may include a transparent substrate, a color filter, and a common electrode. The color filter may include filters for selectively passing light of a particular wavelength of white light emitted from the backlight unit 2100. The liquid crystal layer 2330 may be configured to be rearranged by an electric field formed between the pixel electrodes and the common electrode to adjust light transmittance. The transmittance-adjusted light maybe configured to display an image bypassing through the color filter of the color filter substrate 2340. The image display panel 2300 may further include a drive circuit unit and the like processing an image signal.

In the display device 2000 according to this embodiment, since the light source 3132 may be configured to emit blue light, green light, and red light having a relatively small full width at half maximum, the emitted light may implement blue, green, and red light of high color purity after passing through the color filter substrate 2340.

In other embodiments, the display device 2000 may use the LED driving devices 100 to 700 according to the above-described embodiments with reference to FIGS. 1 to 13 to drive the backlight unit 2100. Thus, the brightness of the backlight unit 2100 may increase or decrease according to an input of the user, or the brightness of the backlight unit 2100 may be controlled automatically by conditions of light intensity, temperature, humidity, number of viewers, and the like detected by a sensor linked to the display device 2000.

FIGS. 24 to 27 are diagrams illustrating a lighting device having an LED driving device according to an embodiment applied thereto.

Figure 24:
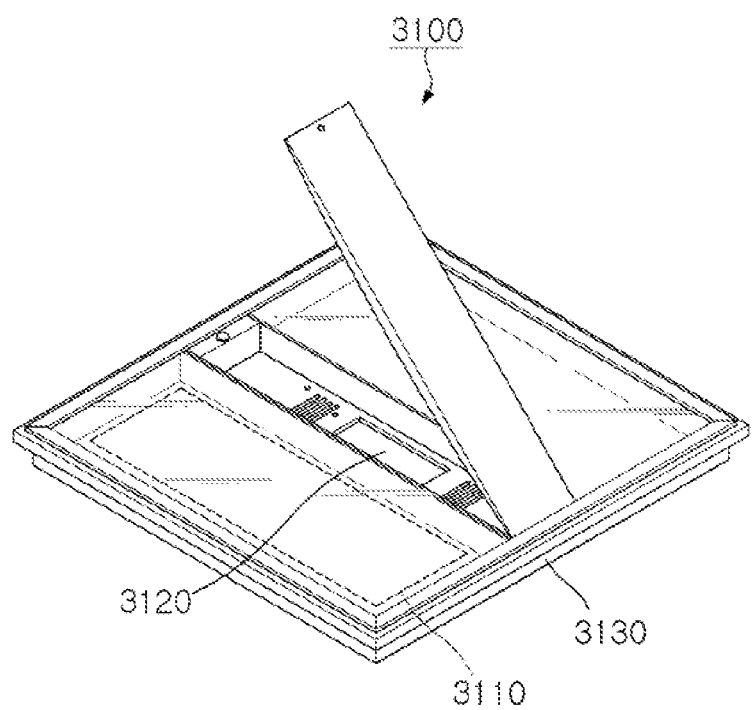
FIGS. 24 to 27 are diagrams illustrating a lighting device having an LED driving device according to an embodiment applied thereto.

FIG. 24 is a perspective view illustrating an overview of a flat lighting device according to an embodiment.

Referring to FIG. 24, a flat lighting device 3100 may include a light source module 3110, a power supply device 3120, and a housing 3130. According to an embodiment, the light source module 3110 may include a light-emitting element array as a light source, and the power supply device 3120 may include a light-emitting element driving unit.

The light source module 3110 may include a light-emitting element array, and may be formed to have an overall planar shape. According to an embodiment, the light-emitting element array may include light-emitting elements and a controller storing driving information regarding the light-emitting elements.

The power supply device 3120 may be configured to supply power to the light source module 3110. The housing 3130 may have a receiving space so that the light source module 3110 and the power supply device 3120 may be received therein, and may have a hexahedral shape of which one side is open, but is not limited thereto. The light source module 3110 may be disposed to emit light from an open side of the housing 3130.

Figure 25:
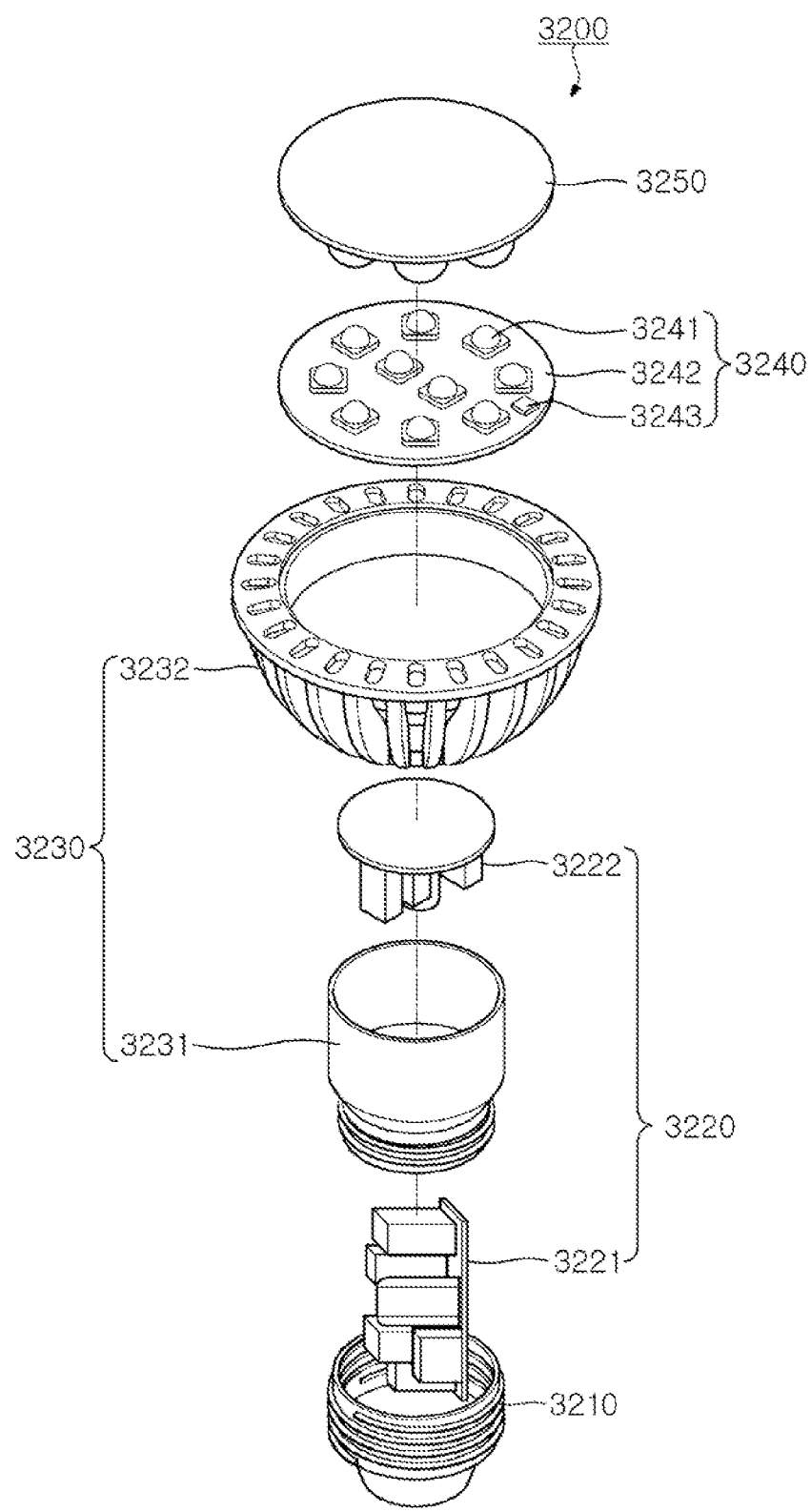

FIG. 25 is an exploded perspective view illustrating an overview of a bulb-type lamp as a lighting device according to an embodiment.

In detail, a lighting device 3200 may include a socket 3210, a power unit 3220, a heat-radiating unit 3230, a light source module 3240, and an optical unit 3250. According to an embodiment, the light source module 3240 may include a light-emitting element array, and the power supply unit 3220 may include a light-emitting element driving unit.

The socket 3210 may be configured to replace an existing lighting device. Power supplied to the lighting device 3200 may be applied through the socket 3210. As illustrated, the power unit 3220 may be separated and assembled into a first power unit 3221 and a second power unit 3222. The heat-radiating unit 3230 may include an internal heat-radiating unit 3231 and an external heat-radiating unit 3232. The internal heat-radiating unit 3231 may be connected directly to the light source module 3240 and/or the power unit 3220, through which heat may transfer to the external heat-radiating unit 3232. The optical unit 3250 may include an internal optical unit and an external optical unit, and may be configured to distribute light emitted from the light source module 3240 evenly.

The light source module 3240 may emit light to the optical unit 3250 by receiving power from the power unit 3220. The light source module 3240 may include at least one light-emitting element 3241, a circuit board 3242, and a controller 3243, and the controller 3243 may be capable of storing driving information regarding the light-emitting elements 3241.

Figure 26:
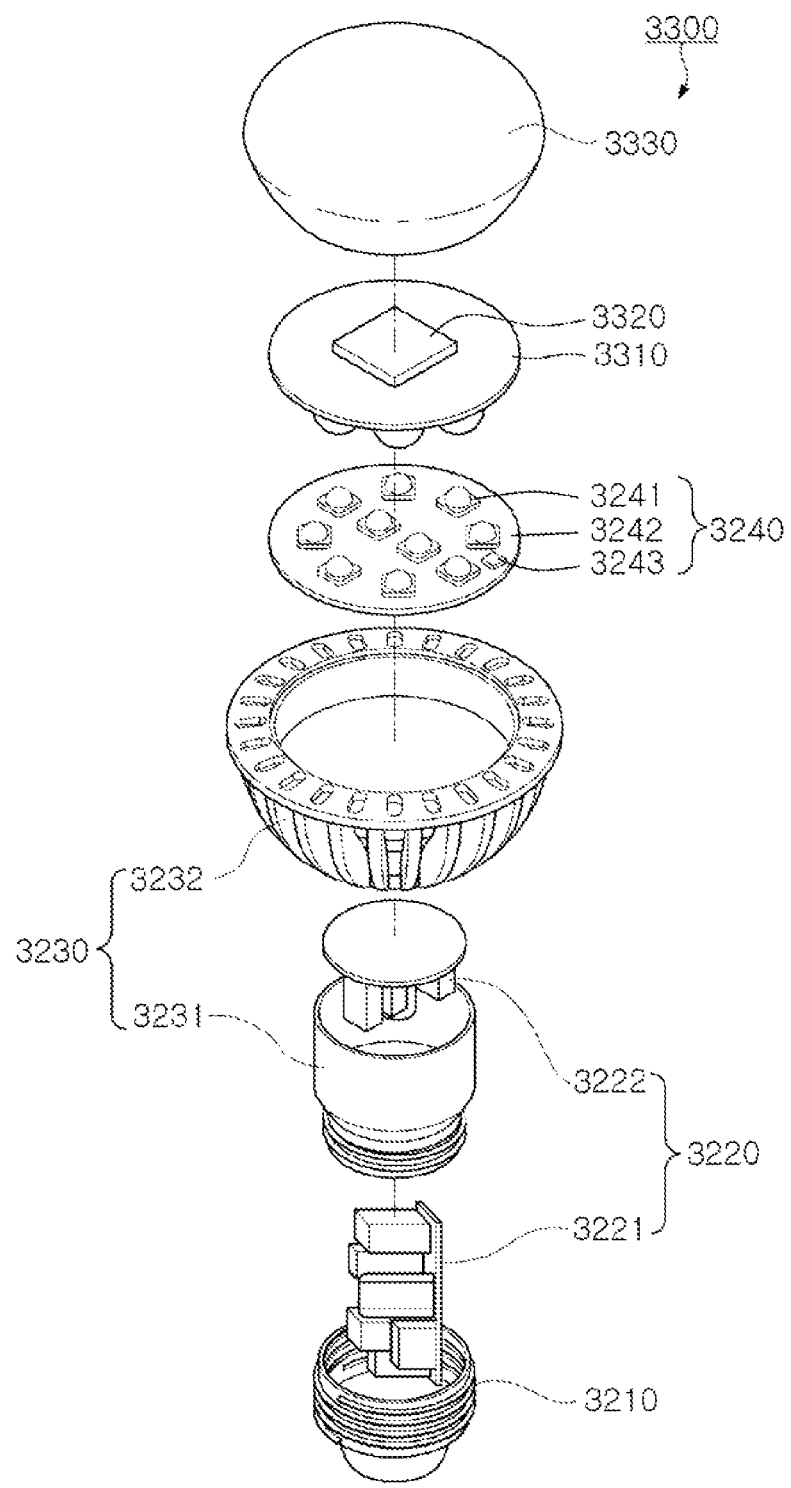

FIG. 26 is a schematic exploded perspective view of a lighting device according to an embodiment illustrating a lamp including a communications module.

In detail, the difference between a lighting device 3300 according to the embodiment and the lighting device 3200 according to the embodiment in FIG. 25 may be that a reflecting plate 3310 is included on an upper portion of the light source module 3240, and the reflecting plate 3310 may reduce glare by evenly spreading light from the light source to the side surface and rear portion of the lighting device 3300.

A communications module 3320 may be mounted on an upper portion of the reflecting plate 3310, and home-network communications may be implemented via the communications module 3320. For example, the communications module 3320 may be a wireless communications module using ZigBee®, Wi-Fi, or Li-fi, and may control on/off switching operations, brightness, and the like of lighting devices installed in and around the home via a smartphones, wireless controller, automation system, or the like. In addition, electronic products such as TVs, refrigerators, air conditioners, door locks, and the like, as well as vehicle systems may be controlled with the use of a Li-Fi communications module using visible light wavelengths from lighting devices installed in and around the home.

The reflecting plate 3310 and the communications module 3320 may be covered by a cover portion 3330.

Figure 27:
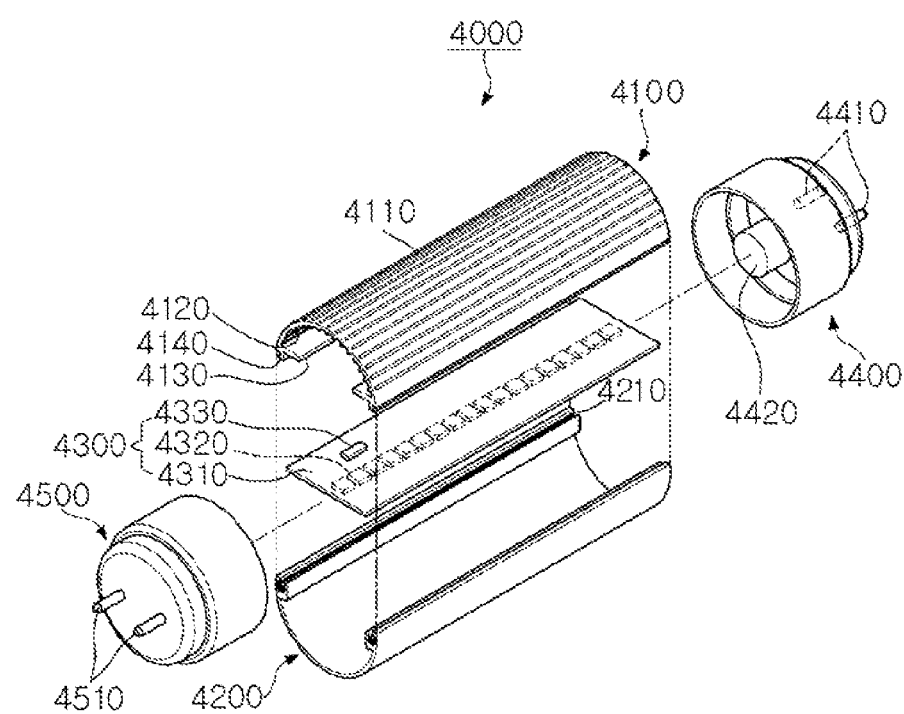

FIG. 27 is an exploded perspective view of a bar-type lamp as a lighting device according to an embodiment.

In detail, a lighting device 4000 may include a heat-radiating member 4100, a cover 4200, a light source module 4300, a first socket 4400, and a second socket 4500. Multiple heat-radiating fins 4110 and 4120 on the internal and/or external surfaces of the heat-radiating member 4100 in a corrugated form, and the heat-radiating fins 4110 and 4120 may be designed to have various shapes and spacings. A protruded supporting fixture 4130 may be formed on the inside of the heat-radiating member 4100. A light source module 4430 may be fixed to the supporting fixture 4130. Locking projections 4140 may be formed on both sides of the heat-radiating member 4100 opposing each other.

A locking groove 4210 may be formed in the cover 4200, and the locking projections 4140 of the heat-radiating member 4100 may be coupled to the locking groove 4210 in a hook coupling structure. The locations in which the locking groove 4210 and the locking projections 4140 are formed may be interchangeable with each other.

The light source module 4300 may include a light-emitting element array. The light source module 4300 may include a printed circuit board 4310, a light source 4320, and a controller 4330. As described above, the controller 4330 may store driving information regarding the light source 4320. Circuit wirings for operating the light source 4320 may be formed in the printed circuit board 4310. In addition, the light source module 4300 may include configuration elements for operating the light source 4320.

The first and second sockets 4400 and 4500 as a pair of sockets may have a structure of being coupled to both ends of a cylindrical cover unit configured of the heat-radiating member 4100 and the cover 4200. For example, the first socket 4400 may include an electrode terminal 4410 and a power device 4420, and a dummy terminal 4510 may be disposed on the second socket 4500. In addition, an optical sensor and/or a communications module may be provided in anyone of the first socket 4400 or the second socket 4500. For example, an optical sensor and/or a communications module may be provided in the second socket 4500 on which the dummy terminal 4510 is provided. As another example, an optical sensor and/or a communications module may be provided in the first socket 4400 on which the electrode terminal 4410 is disposed.

Figure 28:
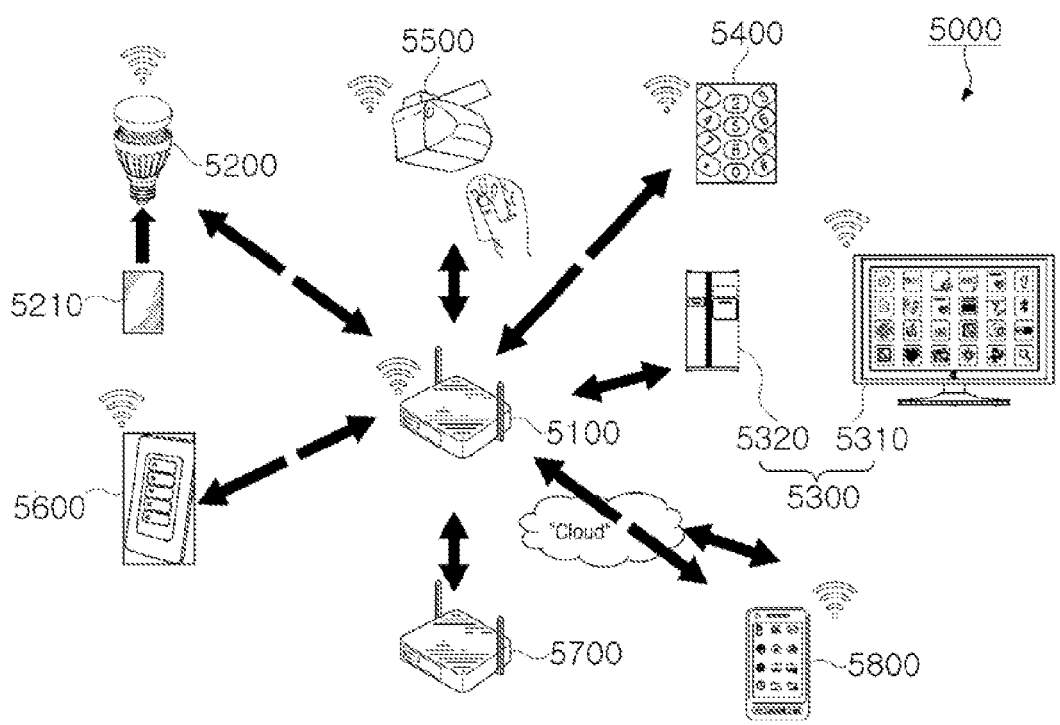
FIGS. 28 to 30 are diagrams illustrating a lighting control network system including an LED driving device according to an embodiment.
Figure 29:
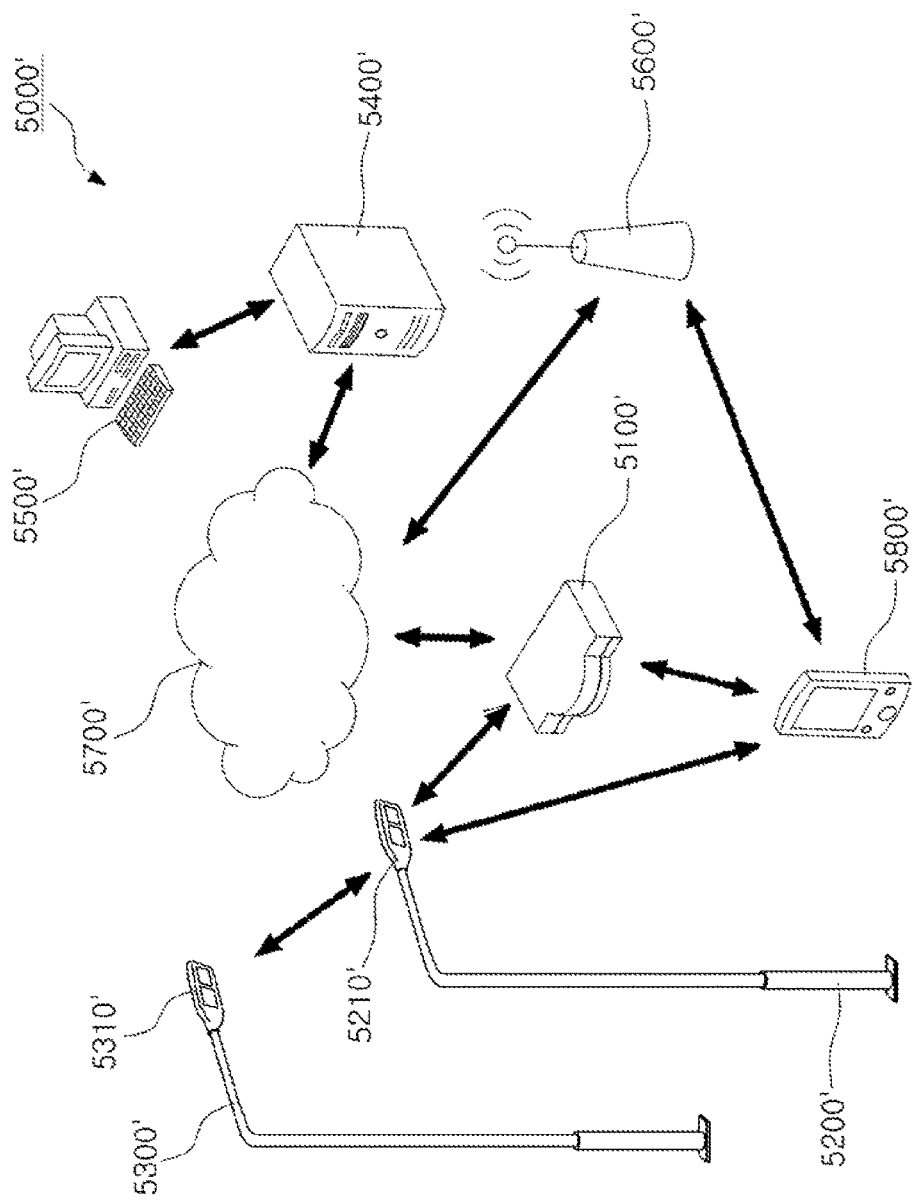
Figure 30:
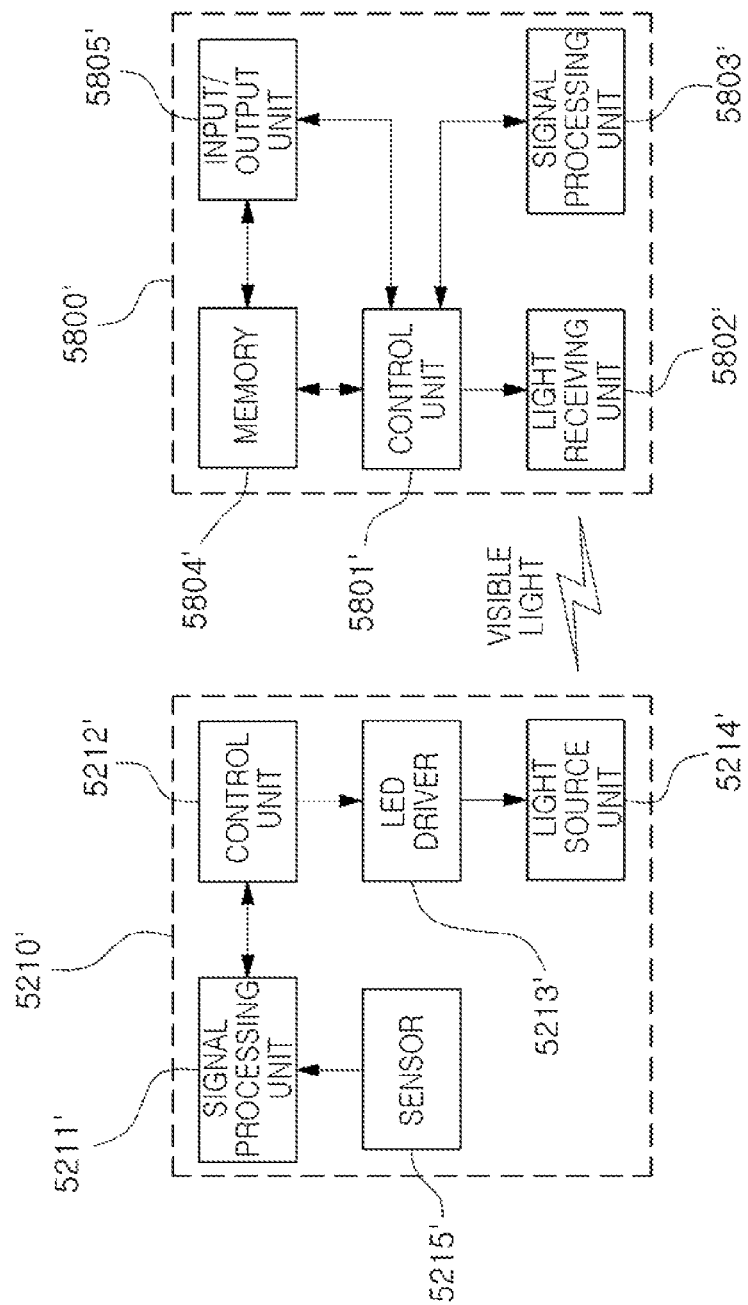

FIGS. 28 to 30 are diagrams illustrating a lighting control network system including an LED driving device according to an embodiment.

FIG. 28 is a schematic diagram illustrating an indoor lighting control network system.

A network system 5000 according to an embodiment may be a complex smart lighting-network system fused with lighting technology using light-emitting elements such as LEDs, Internet of Things (IoT) technology, wireless communications technology, and the like. The network system 5000 may be implemented using a range of lighting devices and wired and wireless communications devices, and may be implemented by software for control and maintenance of sensors, controllers, communications means, network, and the like.

The network system 5000 may be applied not only to closed spaces within buildings such as homes or offices, but also to open spaces such as parks, streets, and the like. The network system 5000 may be implemented based on IoT environment to acquire/process and provide a range of information to users. In this case, an LED lamp 5200 included in the network system 5000 may not only be configured to control light of the LED lamp 5200 itself by receiving information regarding the surrounding environment from a gateway 5100, but also perform operations such as status verification, control, and the like of other devices 5300 to 5800 included in the IoT environment based on visible light communications and the like of the LED lamp 5200.

Referring to FIG. 28, the network system 5000 may include a gateway 5100 be configured to process data transmitted and received according to different communication protocols with respect to each other, an LED lamp 5200 connected to a gateway 5100 to allow communications and including LED light-emitting elements, and multiple devices 5300 to 5800 connected to the gateway 5100 to allow communications therewith according to various wireless communications methods. In order to implement the network system 5000 based on the IoT environment, the respective devices 5300 to 5800, including the LED lamp 5200, may include at least one communications module. In an embodiment, the LED lamp 5200 may be connected to the gateway 5100 to allow communications by a wireless communications protocol such as Wi-Fi, ZigBee®, Li-Fi, and the like, and to this end, may have at least one communications module 5210 for a lamp.

As described above, the network system. 5000 may be used not only in closed spaces such as homes or offices, but also to open spaces such as parks or streets. In a case in which the network system 5000 is used in a home, the devices 5300 to 5800 included in the network system 5000, connected to the gateway 5100 to allow communications based on the IoT technology, may include home appliances 5300, digital door locks 5400, garage door locks 5500, lighting switches 5600 such as those installed on walls, routers 5700 be configured to provide access to a wireless communications network, and mobile devices 5800 such as smart phones, tablets, and laptop computers.

In the network system 5000, the LED lamp 5200 may be configured to verify operating statuses of the various devices 5300 to 5800 using a wireless communications network installed in the home (Zigbee®, Wi-Fi, Li-Fi, etc.), or may be configured to automatically adjust light intensity of the LED lamp 5200 itself according to the surrounding environment/conditions . In addition, the devices 5300 to 5800 included in the network system 5000 may also be controlled using Li-Fi communications which uses visible light emitted from the LED lamp 5200.

First, the LED lamp 5200 may automatically adjust the light intensity of the LED lamp 5200 based on information regarding the surrounding environment transmitted from the gateway 5100 via the communications module 5210 for the lamp 5200, or information regarding the surrounding environment acquired from the sensor mounted on the LED lamp 5200. For example, brightness of the LED lamp 5200 may be automatically adjusted according to brightness of a screen or the type of program being broadcast on a television 5310. To this end, the LED lamp 5200 may be configured to receive operating information regarding the television 5310 from the communications module 5210 for a lamp connected to the gateway 5100. The communications module 5210 for a lamp may be integrated as a module with the sensor and/or the controller included in the LED lamp 5200.

For example, if the program being aired on television is a documentary, the lighting may be lowered to a color temperature of about 12000K or less, such as 5000K, and the color may be adjusted, depending on a pre-set setting value, in order to create a cozy atmosphere . If the program is a comedy, the color temperature may increased to about 5000K or more according to the luminance setting value, and the network system 5000 may be configured to be adjusted to white light in a blue color series.

In addition, after a preset period of time passes when the digital door lock 5400 is locked in a state where no one is at home, all of the LED lamps 5200 that are turned on may be turned off to prevent electricity wastage. Alternatively, when security mode is set via a mobile device 5800 and the like, and the digital door lock 5400 is locked in a state where no one is at home, the LED lamp 5200 may be kept turned on.

The operation of the LED lamp 5200 may be controlled according to the surrounding environment information collected from a range of sensors connected to the network system 5000. For example, when the network system 5000 is implemented in a building, lighting may be turned on or off by combining the lighting, the position sensor, and the communications module in a building and collecting location information regarding people in the building, or collected information may be provided in real time to enable facility management or more efficient use of idle space. Since general lighting devices such as the LED lamp 5200 may be disposed in a majority of space in each floor of a building, a range of information regarding the building may be collected via a sensor provided integrally with the LED lamp 5200, which may be used in facility management and use of idle space.

In addition, by combining the LED lamp 5200 with an image sensor, a storage device, the communications module 5210 for a lamp, and the like, the lamp may be utilized as a device for maintaining security in a building or detecting and responding to emergencies. For example, if a smoke detector or a temperature sensor or the like is provided in the LED lamp 5200, damage may be significantly reduced by immediate detection of fire and the like. In addition, energy may be saved and a comfortable lighting atmosphere may be provided by controlling the brightness of the lighting in consideration of external weather conditions or sunlight.

As described above, the network system 5000 may be applied not only to closed spaces such as homes, offices, or buildings but also to open spaces such as parks or streets. In a case of applying the network system 5000 to an open space with no physical limits, communications may be relatively difficult in implementing the network system 5000 due to factors such as a distance limit of wireless communications and communications interference due to various obstacles. The network system 5000 may be more efficiently implemented in an open environment as described above by mounting a sensor, a communications module and the like to respective lighting fixtures, and using respective lighting fixtures as information acquisition units and a communications intermediate unit, which will be described below with reference to FIG. 29.

FIG. 29 illustrates an embodiment of a network system 5000' applied to an open space. Referring to FIG. 29, the network system 5000' according to the embodiment may include a communications connection device 5100', multiple lighting fixtures 5200' and 5300' connected to the communications connection device 5100' at predetermined distances to allow communications, a server 5400', a computer 5500' for managing the server 5400', a communications base station 5600', a communications network 5700' for connecting the above communications devices, and a mobile device 5800'.

The lighting fixtures 5200' and 5300' installed in external open spaces, such as a street or a park, may respectively include smart engines 5210' and 5310'. The smart engines 5210' and 5310' may include a sensor configured to collect information regarding a surrounding environment, a communications module, and the like, in addition to light-emitting elements, and a driver for driving the light-emitting elements. The smart engines 5210' and 5310' may be configured to communicate with other devices nearby by the communications module according to a communications protocol such as Wi-Fi, Zigbee®, and Li-Fi.

For example, a single smart engine 5210' may be connected to another smart engine 5310' to enable communications therewith. In this case, a Wi-Fi extension technique (Wi-Fi mesh) may be applied to communications between the smart engines 5210' and 5310'. At least one smart engine 5210' may be connected to the communications connection device 5100' connected to the communications network 5700' by a wired/wireless communications. In order to improve communications efficiency, multiple smart engines 5210' and 5310' may be coupled together as a single group and connected to a single communications connection device 5100'.

The communications connection device 5100' may be an access point (AP) capable of allowing for wired/wireless communications, and may intermediate the communications between the communications network 5700' and other devices. The communications connection device 5100' may be connected to the communications network 5700' in at least one of wired and wireless manners, and for example, the communications connection device may be stored mechanically inside at least one of the lighting fixtures 5200' and 5300'.

The communications connection device 5100' may be connected to the mobile device 5800' via a communications protocol such as Wi-Fi or the like. A user of the mobile device 5800' may receive information regarding a surrounding environment collected by multiple the smart engines 5210' and 5310' via the communications connection device 5100' connected to the smart engine 5210' of the lighting fixture 5200' in the vicinity. The information regarding the surrounding environment may include surrounding traffic information, weather information, and the like.

The mobile device 5800' may be connected to the communications network 5700' in a wireless cellular communications method such as 3G or 4G via the communications base station 5600'.

On the other hand, the server 5400' connected to the communications network 5700' may be configured to receive information collected by the smart engines 5210' and 5310' mounted in the respective lighting fixtures 5200' and 5300', and simultaneously, may monitor operations status, and the like, of the respective lighting fixtures 5200' and 5300'. In order to manage the respective lighting fixtures 5200' and 5300' based on the monitoring result of the operation status of the respective lighting fixtures 5200' and 5300', the server 5400' may be connected to the computer 5500' providing a management system. The computer 5500' may run a software and the like capable of monitoring and managing the operation status of the respective lighting fixtures 5200' and 5300', in detail, the smart engines 5210' and 5310'.

A range of communications methods may be applied to transfer the information collected by the smart engines 5210' and 5310' to a user's mobile device 5800'. Referring to FIG. 30, the information collected by the smart engines 5210' and 5310' may be transferred to the mobile device 5800' via the communications connection device 5100' connected to the smart engines 5210' and 5310', or the mobile device 5800', and the smart engines 5210' and 5310' maybe connected directly to the mobile device 5800' to allow direct communications. The smart engines 5210' and 5310' and the mobile device 5800' may be configured to communicate directly with each other by a visible light wireless communications (Li-Fi), which will be described below with reference to FIG. 30.

FIG. 30 is a block diagram illustrating a communications operation of the smart engine 5210' of the lighting fixture 5200' and the mobile device 5800' by visible light wireless communications. Referring to FIG. 30, the smart engine 5210' may include a signal processing unit 5211', a control unit 5212', an LED driver 5213', a light source unit 5214', a sensor 5215', and the like. The mobile device 5800' may be connected to the smart engine 5210' by visible light wireless communications may include a control unit 5801', a light receiving unit 5802', a signal processor 5803', a memory 5804', an input/output unit 5805', and the like.

The visible light wireless communications (Li-Fi) technology may be a wireless communications technology for transmitting information wirelessly using light in a visible wavelength band recognized by the human eye. Such a visible light wireless communications technology may be distinguished from the existing wired optical communications technology and infrared wireless communications in that light in a visible light wavelength band, in detail, a specific visible light frequency from the light-emitting package described in the embodiment is used, and may be distinguished from wired optical communications technology in that the communications environment is wireless. Further, the visible light wireless communications technology may be used freely without being regulated or otherwise authorized in terms of use of frequency, and thus may be convenient and the physical security thereof may be excellent, unlike RF wireless communications, and may be differentiated in that the communications link may be checked visually by the user. Moreover, the visible light wireless communications may be characterized as a fusion technique which may simultaneously obtain an inherent purpose and a communications function from the light source.

Referring to FIG. 30, the signal processing unit 5211' of the smart engine 5210' may be configured to process data to be transmitted and received by the visible light wireless communications. In an embodiment, the signal processing unit 5211' may be configured to transmit information collected by the sensor 5215' to the control unit 5212' by processing the information into data. The control unit 5212' may be configured to control operations of the signal processing unit 5211', the LED driver 5213', and the like, and in detail, may be configured to control the operation of the LED driver 5213' based on the data transmitted by the signal processing unit 5211'. The LED driver 5213' may be configured to transmit data to the mobile device 5800' by allowing the light source unit 5214' to emit light in response to a control signal transmitted by the control unit 5212'.

The mobile device 5800' may include a control unit 5801', a memory 5804' storing data, an input/output unit 5805' including a display, a touch screen, an audio output unit, and the like, a signal processing unit 5803', and a light receiving unit 5802' for recognizing visible light containing data. The light receiving unit 5802' may be configured to detect visible light and convert the visible light into an electrical signal, and the signal processing unit 5803' may be configured to decode the data contained in the electric signal converted by the light receiving unit 5802'. The control unit 5801' may be configured to store the data decoded by the signal processing unit 5803' in the memory 5804', or output the decoded data via the input/output unit 580540 to be recognized by the user.

As set forth above, according to an embodiment, the LED driving device may control the driving power supplied to the LED according to the operation of the inductance modifier or the output modifier provided on the primary side of the transformer. The LED driving device according to an embodiment may provide a dimming function with a simple circuit configuration, and may be applied universally to various LEDs having different load characteristics with respect to each other.

An embodiment includes an LED driving device capable of driving a variety of semiconductor light-emitting elements having different characteristics with respect to each other as light sources and loads, and providing a dimming function from a simple circuit configuration.

In an embodiment, an LED driving device may include a rectifier converting alternating current (AC) power to direct current (DC) power; a convertor including a transformer stepping-up or stepping-down the DC power, a main switch connected to a primary-side winding of the transformer, and an output circuit connected to a secondary-side winding of the transformer and supplying driving power to a plurality of light-emitting diodes (LED); a controller configured to control operations of the converter by outputting a control signal to the main switch; and an output modifier connected to a primary side of the transformer, and configured to modify the driving power by adjusting at least one of an operating frequency and a duty cycle ratio of the control signal.

In an embodiment, an LED driving device may include a rectifier converting AC power to DC power; a convertor including a transformer stepping-up or stepping-down the DC power, a main switch connected to a primary side of the transformer, an output circuit connected to a secondary side of the transformer and supplying driving power to a plurality of LEDs, and an inductance modifier connected to a primary-side winding of the transformer modifying a primary-side inductance of the transformer; and a controller configured to control operations of the converter by supplying a control signal to the main switch.

While embodiments have been shown and described above, it will be apparent to those skilled in the art that modifications and variations could be made without departing from the scope as defined by the appended claims.

What is claimed is:

1. A light-emitting diode (LED) driving device comprising:
   a rectifier configured to convert alternating current (AC) power to direct current (DC) power;
   a convertor including:
      a transformer including a primary-side winding connected to the rectifier; and
      a main switch connected to the primary-side winding of the transformer;
   a controller configured to output a control signal to the main switch in response to a feedback signal; and
   an output modifier configured to modify the feedback signal;
   wherein:
      the output modifier includes a resistance circuit having variable resistance and is connected to the main switch in series; and
      the resistance circuit includes a plurality of resistors connected to each other in parallel, and at least one switching element configured to connect or disconnect the resistors to and from each other.

2. The LED driving device of claim 1, wherein the controller is further configured to adjust at least one of an operating frequency and a duty cycle ratio of the control signal.

3. The LED driving device of claim 1, further comprising an output circuit connected to a secondary-side winding of the transformer and configured to supply driving power to at least one light-emitting diode (LED).

4. The LED driving device of claim 1, wherein the controller is configured to increase a driving power by raising at least one of an operating frequency and a duty cycle ratio of the control signal, and to reduce the driving power by lowering at least one of the operating frequency and the duty cycle ratio of the control signal.

5. The LED driving device of claim 1, wherein the output modifier further includes an inductance modifier connected to the primary-side winding of the transformer and configured to selectively modify an inductance of the primary-side winding of the transformer.

6. The LED driving device of claim 5, wherein the inductance modifier includes a switching element connected in parallel across at least a portion of the primary-side winding of the transformer.

7. The LED driving device of claim 5, further comprising a second output modifier including a time constant control circuit having a variable resistance and configured to adjust a time constant of the main switch.

8. The LED driving device of claim 1, further comprising a second output modifier including a time constant control circuit having a variable resistance and configured to adjust a time constant of the main switch.

9. The LED driving device of claim 8, wherein the time constant control circuit is connected to at least one capacitor included in the controller and is configured to adjust a time in which the at least one capacitor is charged or discharged.

10. A light-emitting diode (LED) driving device comprising:
a rectifier configured to convert alternating current (AC) power to direct current (DC) power;
a convertor including:
a transformer including a primary-side winding connected to the rectifier;
a main switch connected to the primary-side winding of the transformer; and
an inductance modifier connected to a primary-side winding of the transformer and configured to selectively modify a primary-side inductance of the transformer; and
a controller configured to output a control signal to the main switch in response to a feedback signal from the convertor;
wherein the inductance modifier includes a switching element connected in parallel across at least a portion of the primary-side winding of the transformer.

11. The LED driving device of claim 10, further comprising an output circuit connected to a secondary side of the transformer and configured to supply a driving power to at least one LED.

12. The LED driving device of claim 10, further comprising an output modifier including a time constant control circuit having a variable resistance and configured to adjust a time constant of the main switch.

13. The LED driving device of claim 12, wherein the time constant control circuit is connected to at least one capacitor included in the controller and is configured to adjust a time in which the at least one capacitor is charged or discharged.

14. A light-emitting diode (LED) driving device comprising:
a rectifier configured to convert alternating current (AC) power to direct current (DC) power;
a convertor including:
a transformer including a primary-side winding connected to the rectifier; and
a main switch connected to the primary-side winding of the transformer;
a controller configured to output a control signal to the main switch in response to a feedback signal from the convertor; and
an output modifier configured to modify a time constant of the main switch
wherein:
the output modifier includes a time constant control circuit having a variable resistance; and
the time constant control circuit is connected to at least one capacitor included in the controller and is configured to adjust a time in which the at least one capacitor is charged or discharged.

15. The LED driving device of claim 14, further comprising an auxiliary winding connected to a power supply input of the controller, wherein the controller is configured to detect a voltage of the auxiliary winding.

* * * * *